United States Patent
Lee et al.

(10) Patent No.: US 9,625,947 B2
(45) Date of Patent: Apr. 18, 2017

(54) PORTABLE ELECTRONIC DEVICE

(71) Applicant: LG Electronics Inc., Seoul (KR)

(72) Inventors: Haklim Lee, Seoul (KR); Wonseok Joo, Seoul (KR); Hanseok Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/727,216

(22) Filed: Jun. 1, 2015

(65) Prior Publication Data

US 2016/0116944 A1 Apr. 28, 2016

(30) Foreign Application Priority Data

Oct. 27, 2014 (KR) .................. 10-2014-0145761

(51) Int. Cl.
 *G06F 1/16* (2006.01)
 *H04M 1/02* (2006.01)
(52) U.S. Cl.
 CPC .......... *G06F 1/1652* (2013.01); *G06F 1/1616* (2013.01); *G06F 1/1681* (2013.01); *H04M 1/022* (2013.01); *H04M 1/0216* (2013.01); *H04M 2250/16* (2013.01); *H04M 2250/22* (2013.01); *H04M 2250/52* (2013.01)
(58) Field of Classification Search
 CPC .... G06F 1/1652; G06F 1/1616; G06F 1/1681; H04M 1/022; H04M 1/0216; H04M 2250/16; H04M 2250/52; H04M 2250/22
 USPC .......................... 361/679.27, 679.01, 679.21
 See application file for complete search history.

(56) References Cited

U.S. PATENT DOCUMENTS

| | | | |
|---|---|---|---|
| 7,565,720 B1 | 7/2009 | Ligtenberg et al. | |
| 2010/0232100 A1* | 9/2010 | Fukuma | F16G 13/18 361/679.01 |
| 2012/0044620 A1* | 2/2012 | Song | G06F 1/1616 361/679.01 |
| 2012/0307423 A1* | 12/2012 | Bohn | G06F 1/1641 361/679.01 |
| 2013/0021762 A1* | 1/2013 | van Dijk | G06F 1/1652 361/749 |
| 2013/0070431 A1* | 3/2013 | Fukuma | G06F 1/1652 361/749 |

(Continued)

FOREIGN PATENT DOCUMENTS

| | | |
|---|---|---|
| DE | 202014103159 U1 | 9/2014 |
| EP | 2573644 A2 | 3/2013 |

(Continued)

*Primary Examiner* — Tuan T Dinh
*Assistant Examiner* — Rockshana Chowdhury
(74) *Attorney, Agent, or Firm* — Dentons US LLP

(57) ABSTRACT

Disclosed are a portable electronic device having a display unit which can be bent or folded partially or wholly, and a control method thereof. The portable electronic device includes: a display unit having a front surface and a rear surface, and formed to be flexible; and a folding unit including a plurality of blocks and a connection unit, and configured to be foldable together with the display unit, the plurality of blocks overlapped with each other on the rear surface of the display unit, the connection unit configured to connect the plurality of blocks to each other, wherein the plurality of blocks are arranged such that at least part thereof is relatively-movable with respect to neighboring blocks in a direction to become far from or close to the neighboring blocks.

26 Claims, 22 Drawing Sheets

(56) References Cited

U.S. PATENT DOCUMENTS

| | | | | |
|---|---|---|---|---|
| 2013/0127690 A1* | 5/2013 | Tsai | ................. | G09F 9/301 |
| | | | | 345/55 |
| 2013/0219663 A1* | 8/2013 | Cai | ................. | G06F 1/1681 |
| | | | | 16/371 |
| 2014/0003006 A1* | 1/2014 | Ahn | ................. | G06F 1/1679 |
| | | | | 361/749 |
| 2014/0196254 A1* | 7/2014 | Song | ................. | E05D 3/14 |
| | | | | 16/302 |

FOREIGN PATENT DOCUMENTS

| | | |
|---|---|---|
| KR | 1020130073331 A | 7/2013 |
| WO | 2010076639 A2 | 7/2010 |
| WO | 2012167204 A2 | 12/2012 |

\* cited by examiner

PORTABLE ELECTRONIC DEVICE

CROSS-REFERENCE TO RELATED APPLICATION

Pursuant to 35 U.S.C. §119(a), this application claims the benefit of earlier filing date and right of priority to Korean Application No. 10-2014-0145761, filed on Oct. 27, 2014, the contents of which is incorporated by reference herein in its entirety.

BACKGROUND OF THE INVENTION

1. Field of the Invention

This specification relates to a portable electronic device, and more particularly, to a portable electronic device having a display unit which can be bent or folded partially or wholly.

2. Background of the Invention

A portable electronic device includes all types of devices provided with a battery and a display unit and carried by a user. The devices are configured to output information to the flexible display unit using power supplied from the battery. The portable electronic device includes a device for recording and playing moving images, a device for displaying a graphic user interface (GUI), etc., which includes a notebook, a mobile phone, glasses, a watch, a game console, etc.

Such portable electronic device has become increasingly more functional. Examples of such functions include data and voice communications, capturing images and video via a camera, recording audio, playing music files via a speaker system, and displaying images and video on a display. Some portable electronic devices include additional functionality which supports game playing, while other portable electronic devices are configured as multimedia players. More recently, portable electronic devices have been configured to receive broadcast and multicast signals which permit viewing of content such as videos and television programs.

Such portable electronic device is being evolved to have various designs. In order to satisfy a user's needs for more novel and various designs, efforts are ongoing to develop the portable electronic device of a newer type. The newer type includes structural changes and improvements to use the portable electronic device more conveniently.

One of such structural changes and improvements is a portable electronic device including at least part of a display unit which can be bent or folded.

As such portable electronic device is being spotlighted, a mechanism to fold and unfold a body of the portable electronic device together with the display unit, can be considered.

SUMMARY OF THE INVENTION

Therefore, an aspect of the detailed description is to provide a portable electronic device capable of implementing a new type of body, using characteristics of a foldable or bendable display unit.

Another aspect of the detailed description is to provide a portable electronic device capable of implementing a new form factor where the portable electronic device is folded and unfolded like a book. More specifically, the present invention is to provide a flexible electronic device which can be easily folded and unfolded, despite a length change occurring according to layer, in a thickness direction when folding occurs.

Another aspect of the detailed description is to provide a novel user interface using a physical transformation of a flexible electronic device.

To achieve these and other advantages and in accordance with the purpose of this specification, as embodied and broadly described herein, there is provided a portable electronic device, including: a flexible display unit having a front surface and a rear surface, and formed to be flexible; and a folding unit including a plurality of blocks and a connection unit, and configured to be foldable together with the flexible display unit, the plurality of blocks overlapped with each other on the rear surface of the flexible display unit, the connection unit configured to connect the plurality of blocks to each other, wherein the plurality of blocks are arranged such that at least part thereof is relatively-movable with respect to neighboring blocks in a direction to become far from or close to the neighboring blocks.

In an embodiment, the plurality of blocks may be formed to extend along one edge of the flexible display unit, and may be disposed in parallel to each other in a first state where the flexible display unit is flat. The plurality of blocks may be configured as long bars formed in one direction. The plurality of blocks may be configured such that at least part thereof performs a relative motion with respect to neighboring blocks to a direction to become far from the neighboring blocks, when the flexible display unit is converted to a second state, a folded state, from the first state. The plurality of blocks may be formed such that a separation distance between neighboring blocks in the second state is variable in a direction passing through the flexible display unit, so as to be arranged along a curved path.

In an embodiment, the plurality of blocks may be formed such that one end thereof is tilted based on a connection shaft of the connection unit, when the flexible display unit is converted into the second state from the first state.

In an embodiment, the portable electronic device may further include a pressing module configured to apply a force to the plurality of blocks, in a first state where the flexible display unit is flat, toward a direction which makes the blocks move close to each other. The pressing module may be formed to apply a force to a region adjacent to one end of the plurality of blocks, in a direction passing through the flexible display unit.

In an embodiment, the portable electronic device may further include a first fixing portion and a second fixing portion fixed to a body of the portable electronic device, and arranged such that the plurality of blocks are interposed therebetween.

In an embodiment, a plurality of plates may be mounted to the blocks so as to cover spaces between the blocks. The plurality of plates may be formed such that at least part thereof is overlapped with neighboring plates.

The body of the portable electronic device may be provided with a front surface where the flexible display unit is arranged, and a rear surface where the plurality of plates are arranged. The plurality of plates may be exposed to the outside at the rear surface.

In an embodiment, the connection unit may be provided with links connected to end portions of the plurality of blocks so as to be relatively-movable with respect to each other. The links may be configured as three-point links connected to each other at three parts.

Links of a first group among the links may be configured to sequentially connect one side and another side of the plurality of blocks to each other, and links of a second group among the links may be arranged to cross the links of the first group. The links of the second group may be sequentially connected to one side and another side of the links of the first group. The links of the first group and the links of the second group may be connected to each other at crossing parts thereof.

The links of the second group may be provided with protrusions protruding between two ends of a link body, and the protrusion may be rotatably connected to the links of the first group by being arranged at the crossing parts.

The links of the second group may include the protrusions, and grooves formed between two ends of the link body. The grooves may be formed to accommodate therein end portions of the links of the second group, in the second state where the flexible display unit has been folded.

In an embodiment, a cover formed of a flexible material may be mounted to a side surface of the body of the portable electronic device. The cover may be formed to be foldable at a plurality of points, along the side surface of the body.

In an embodiment, the flexible display unit may include a flexible display, a first member arranged to be overlapped with the flexible display, and a second member arranged to be overlapped with the first member.

In an embodiment, at least one of the first member and the second member may be formed of a shape memory alloy configured to return to the original shape by remembering a shape at a specific temperature. One of the first and second members may be formed of a material having lower intensity than that of the other.

The flexible display may be provided with a folding region overlapped with the folding unit, and a first region and a second region formed at two sides of the folding region and coupled to the first member.

In an embodiment, the flexible display unit may be disposed on the front surface of the body of the portable electronic device, and a rear cover which forms the rear surface of the body may be formed to be flexible so as to be transformed by an external force.

According to another aspect of the present invention, there is provided a portable electronic device, including: a body formed such that at least part thereof is flexible; a flexible display unit disposed on one surface of the body, and formed to be flexible so as to be transformable between a first state where the flexible display unit is flat, and a second state where the flexible display unit has been folded; and a folding unit mounted to the body so as to support the flexible display unit, and configured to be foldable by an external force, wherein the folding unit includes a plurality of blocks arranged such that at least part thereof is covered by the flexible display unit, the plurality of blocks formed to perform a relative motion with respect to each other according to a folded state of the folding unit; and a connection unit configured to sequentially connect the plurality of blocks to each other.

According to at least one of preferred embodiments of the present invention, transformation occurring on an overlapped part between the flexible display unit and the portable electronic device when the portable electronic device is folded, can be attenuated or prevented through a combination between the plurality of blocks which perform a relative motion with respect to each other, and the flexible display unit. This can implement a structure where the body of the portable electronic device is entirely folded.

According to at least one of preferred embodiments of the present invention, the portable electronic device can implement a new form factor having no problem in reliability, even if it is repeatedly folded and unfolded like a book. This can provide a new user interface interworked with folding and unfolding operations of the portable electronic device can be implemented.

According to at least one of preferred embodiments of the present invention, as the portable electronic device has a multi-layer structure, both flexibility and strength can be provided when the portable electronic device is transformed. Further, as part of multi layers is formed as blocks which can perform a relative motion with respect to each other, the display unit can be distorted or transformed into an irregular shape.

According to at least one of preferred embodiments of the present invention, under a structure of the connection unit and the folding unit, a mechanism, where each folding region of the flexible display unit and the body of the portable electronic device forms a curved path, can be implemented. Further, under a link structure of the connection unit, the curved path can be maintained in a folded state of the portable electronic device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
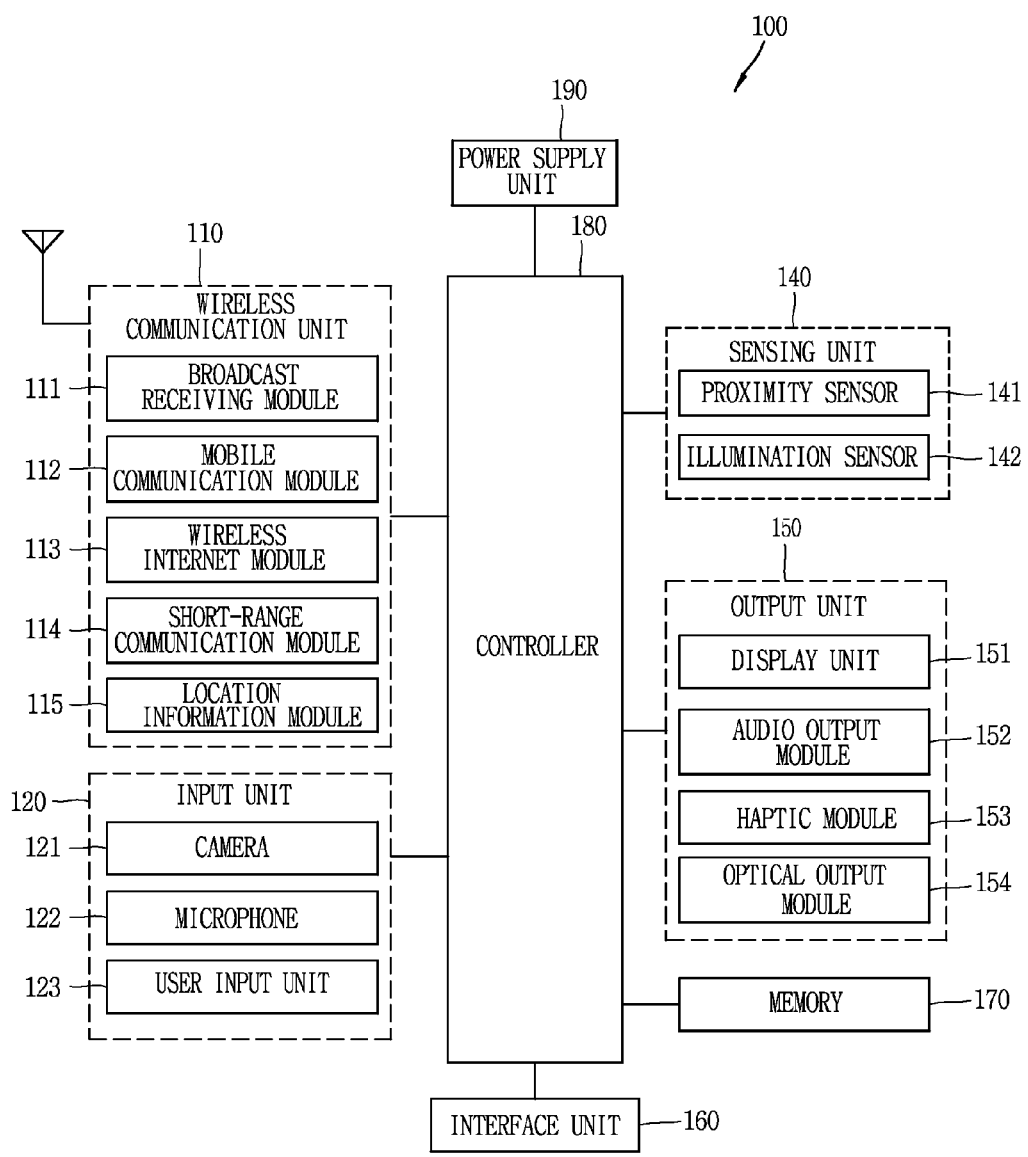
FIG. 1 is a block diagram of a portable electronic device according to an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Portable electronic devices presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of portable electronic devices. However, such teachings apply equally to other types of terminals, such as those types noted above. In addition, these teachings may also be applied to stationary terminals such as digital TVs, desktop computers, a digital signage, and the like.

FIG. 1 is a block diagram of a portable electronic device according to the present invention.

The portable electronic device 100 is shown having components such as a wireless communication unit 110, an input unit 120, an electromagnetic wave generation unit 130, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the portable electronic device 100 is shown having wireless communication unit 110 configured with several commonly implemented components. The wireless communication unit 110 typically includes one or more modules which permit communications such as wireless communications between the portable electronic device 100 and a wireless communication system, communications between the portable electronic device 100 and another portable electronic device, communications between the portable electronic device 100 and an external server. Further, the wireless communication unit 110 typically includes one or more modules which connect the portable electronic device 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The electromagnetic wave generation unit 130 generates electromagnetic waves having a linear characteristic, as a trigger signal for controlling an external device positioned at a short distance. More specifically, the electromagnetic wave generation unit 130 generates electromagnetic waves having a specific frequency, under control of the controller 180. That is, electromagnetic waves generated by the electromagnetic wave generation unit 130 may have various frequencies under control of the controller 180. The electromagnetic waves may include various data for controlling an external device. More specifically, the electromagnetic waves may include a request message requesting information related to an external device, or an identifier for security.

The sensing unit 140 is typically implemented using one or more sensors configured to sense internal information of the portable electronic device, the surrounding environment of the portable electronic device, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The portable electronic device 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the portable electronic device 100 and a user, as well as function as the user input unit 123 which provides an input interface between the portable electronic device 100 and the user.

The display unit 151 is generally configured to output information processed in the portable electronic device 100. For example, the display unit 151 may display execution screen information of an application program executing at the portable electronic device 100 or user interface (UI) and graphic user interface (GUI) information in response to the execution screen information.

The display unit 151 outputs information processed in the portable electronic device 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The interface unit 160 serves as an interface with various types of external devices that can be coupled to the portable electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the portable electronic device 100 may perform assorted control functions associated with a connected external device, in response to the external device being connected to the interface unit 160.

The memory 170 is typically implemented to store data to support various functions or features of the portable electronic device 100. For instance, the memory 170 may be configured to store application programs executed in the portable electronic device 100, data or instructions for operations of the portable electronic device 100, and the like. Some of these application programs may be downloaded from an external server via wireless communication. Other application programs may be installed within the portable electronic device 100 at time of manufacturing or shipping, which is typically the case for basic functions of the portable electronic device 100 (for example, receiving a call, placing a call, receiving a message, sending a message, and the like). It is common for application programs to be stored in the memory 170, installed in the portable electronic device 100, and executed by the controller 180 to perform an operation (or function) for the portable electronic device 100.

The controller 180 typically functions to control overall operation of the portable electronic device 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the portable electronic device 100. The power supply unit 190 may include a battery, and the battery may be configured to be embedded in the body of the portable electronic device, or configured to be detachable from the body of the portable electronic device.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external portable electronic device, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the portable electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the portable electronic device 100 and a wireless communication system, communications between the portable electronic device 100 and another portable electronic device 100, or communications between the portable electronic device and a network where another portable electronic device 100 (or an external server) is located, via wireless area networks. One example of the wireless area networks is a wireless personal area networks.

In some embodiments, another portable electronic device (which may be configured similarly to portable electronic device 100) may be a wearable device, for example, a smart watch, a smart glass or a head mounted display (HMD), which is able to exchange data with the portable electronic device 100 (or otherwise cooperate with the portable electronic device 100). The short-range communication module 114 may sense or recognize the wearable device, and permit communication between the wearable device and the portable electronic device 100. In addition, when the sensed wearable device is a device which is authenticated to communicate with the portable electronic device 100, the controller 180, for example, may cause transmission of data processed in the portable electronic device 100 to the wearable device via the short-range communication module 114. Hence, a user of the wearable device may use the data processed in the portable electronic device 100 on the wearable device. For example, when a call is received in the portable electronic device 100, the user may answer the call using the wearable device. Also, when a message is received in the portable electronic device 100, the user can check the received message using the wearable device.

The location information module 115 is generally configured to detect, calculate, derive or otherwise identify a position of the portable electronic device. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the portable electronic device.

As one example, when the portable electronic device uses a GPS module, a position of the portable electronic device may be acquired using a signal sent from a GPS satellite. As another example, when the portable electronic device uses the Wi-Fi module, a position of the portable electronic device can be acquired based on information related to a wireless access point (AP) which transmits or receives a wireless signal to or from the Wi-Fi module.

The input unit 120 may be configured to permit various types of input to the portable electronic device 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the portable electronic device 100. As another example, the cameras 121 may be located in a stereoscopic arrangement to acquire left and right images for implementing a stereoscopic image.

The microphone 122 is generally implemented to permit audio input to the portable electronic device 100. The audio input can be processed in various manners according to a function being executed in the portable electronic device 100. If desired, the microphone 122 may include assorted noise removing algorithms to remove unwanted noise generated in the course of receiving the external audio.

The user input unit 123 is a component that permits input by a user. Such user input may enable the controller 180 to control operation of the portable electronic device 100. The user input unit 123 may include one or more of a mechanical input element (for example, a key, a button located on a front and/or rear surface or a side surface of the portable electronic device 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the portable electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the portable electronic device, surrounding environment information of the portable electronic device, user information, or the like. The controller 180 generally cooperates with the sending unit 140 to control operation of the portable electronic device 100 or execute data processing, a function or an operation associated with an application program installed in the portable electronic device based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the portable electronic device covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the portable electronic device 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the portable electronic device 100 or a currently executed application program, for example.

The touch sensor provided at the display unit 151 may be configured to sense taps in an activated state and a deactivated state, using different methods. The different methods may be associated with an activation period of the touch sensor. More specifically, the touch sensor may be activated with a different period according to an activated state or a deactivated state of the display unit 151. That is, the touch sensor may sense taps applied thereon, with a different activation period, according to an activated state or a deactivated state of the display unit 151.

For instance, in a deactivated state of the display unit 151, the touch sensor may be activated with a preset period. In this case, the preset period may be a time period more than 0. On the other hand, in an activated state of the display unit 151, the touch sensor may be always operated in an activated state. In this case, an activation period of the touch sensor may be '0' or a value very close to '0'.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. On the other hand, if a power consumption amount of the touch sensor exceeds the preset value based on '0', it may be determined that the touch sensor is in an activated state.

If the display unit 151 is in an activated state (hereinafter, will be referred to as an active mode), the touch sensor may wait for input of taps onto the display unit 151, while maintaining an activated state. On the other hand, if the display unit 151 is in a deactivated state (hereinafter, will be referred to as a doze mode), the touch sensor may be activated at preset periods.

When the preset period of the touch sensor is shorter, a sensing speed with respect to taps applied onto the display unit 151 is higher. However, in this case, a power consumption amount of the touch sensor may be increased. On the other hand, when the preset period of the touch sensor is longer, a sensing speed with respect to taps applied onto the display unit 151 may be lower, while a power consumption amount of the touch sensor is decreased.

Thus, the preset period may be set so that a sensing speed with respect to taps applied onto the display unit 151 is high enough not to be recognized by a user, and so that power consumption can be reduced. For instance, the preset period may be set so that the touch sensor in a deactivated state can be activated about 20 times (1 Hz) per second.

While the display unit 151 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the display unit 151, by several times. That is, the touch sensor may be activated with a different period, according to whether the display unit 151 is in an activated state or a deactivated state.

In a doze mode where the display unit 151 is in a deactivated state and the touch sensor is periodically activated, if a TOCK-TOCK' touch input (first and second touch inputs consecutively applied onto a predetermined region within a reference time) is sensed by the touch sensor, the controller 180 may convert the doze mode into an activate mode where the display unit and the touch sensor are activated.

The touch sensor may be driven at a different period based on a state of the flexible display unit 151. For instance, when the flexible display unit 151 is in a closed state, a doze mode may be executed. On the other hand, when a closed state is converted into an open state, an active mode may be executed.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera 121 is provided with at least one of a first camera 121a formed on a front surface of the body, and a second camera 121b formed on a rear surface of the body.

The first camera 121a may process image frames of still pictures or video obtained by image sensors in a video or image capture mode. The processed image frames can be displayed on the display unit 151 or stored in memory 170.

The second camera 121b can include a plurality of lenses arranged along at least one line. The plurality of lenses may also be arranged in a matrix configuration. The camera may be referred to as an "array camera." When the second camera 121b is implemented as an array camera, images may be captured in various manners using the plurality of lenses and images with better qualities.

A flash (not shown) is shown adjacent to the second camera 121b. When an image of a subject is captured with the camera 121b, the flash may illuminate the subject.

An electromagnetic wave generation unit (not shown) may be disposed close to the second camera 121b. When the second camera 121b is activated, the electromagnetic wave generation unit (not shown) emits generated electromagnetic waves.

The display unit 151 is generally configured to output information processed in the portable electronic device 100. For example, the display unit 151 may display execution screen information of an application program executing at the portable electronic device 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the portable electronic device 100. The audio output module 152 may also be implemented as a receiver, a speaker, a buzzer, or the like.

The audio output module 152 includes at least one of a first audio output module 152a and a second audio output module 152b. The first audio output module 152a may be implemented in the form of a receiver, and the second audio output module 152b may be implemented in the form of a loud speaker to output voice audio, alarm sounds, multimedia audio reproduction, and the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the portable electronic device 100.

An optical output module 154 can output a signal for indicating an event generation using light of a light source.

Examples of events generated in the portable electronic device 100 may include message reception, call signal reception, a missed call, an alarm, a schedule notice, an email reception, information reception through an application, and the like.

A signal output by the optical output module 154 may be implemented in such a manner that the portable electronic device emits monochromatic light or light with a plurality of colors. The signal output may be terminated as the portable electronic device senses that a user has checked the generated event, for example.

The interface unit 160 serves as an interface for external devices to be connected with the portable electronic device 100. For example, the interface unit 160 can receive data transmitted from an external device, receive power to transfer to elements and components within the portable electronic device 100, or transmit internal data of the portable electronic device 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the portable electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the portable electronic device 100 via the interface unit 160.

When the portable electronic device 100 is connected with an external cradle, the interface unit 160 can serve as a passage to allow power from the cradle to be supplied to the portable electronic device 100 or may serve as a passage to allow various command signals input by the user from the cradle to be transferred to the portable electronic device therethrough. Various command signals or power input from the cradle may operate as signals for recognizing that the portable electronic device is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The portable electronic device 100 may also be operated in relation to a network storage device that performs the storage function of the memory 170 over a network, such as the Internet.

The controller 180 may typically control the general operations of the portable electronic device 100. For example, the controller 180 may set or release a lock state for restricting a user from inputting a control command with respect to applications when a status of the portable electronic device meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the portable electronic device 100. The power supply unit 190 may include a battery, which is typically rechargeable or be detachably coupled to the body of the portable electronic device for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the portable electronic device 100 can also be provided on the portable electronic device 100. As one example of an accessory, a cover or pouch for covering or accommodating at least one surface of the portable electronic device 100 may be provided. The cover or pouch may cooperate with the display unit 151 to extend the function of the portable electronic device 100. Another example of the accessory is a touch pen for assisting or extending a touch input to a touch screen.

Various embodiments described herein may be implemented in a computer-readable medium, a machine-readable medium, or similar medium using, for example, software, hardware, or any combination thereof.

Figure 2A:
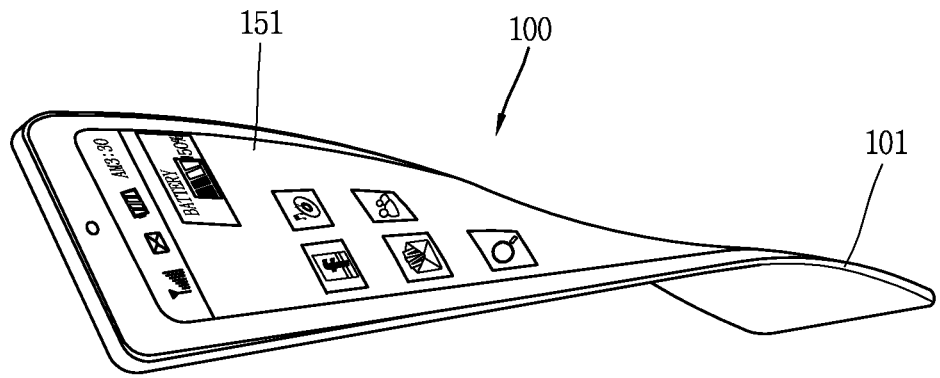
FIGS. 2A and 2B are conceptual views illustrating an example of a portable electronic device according to an embodiment of the present invention, which are viewed from different directions.
Figure 2B:
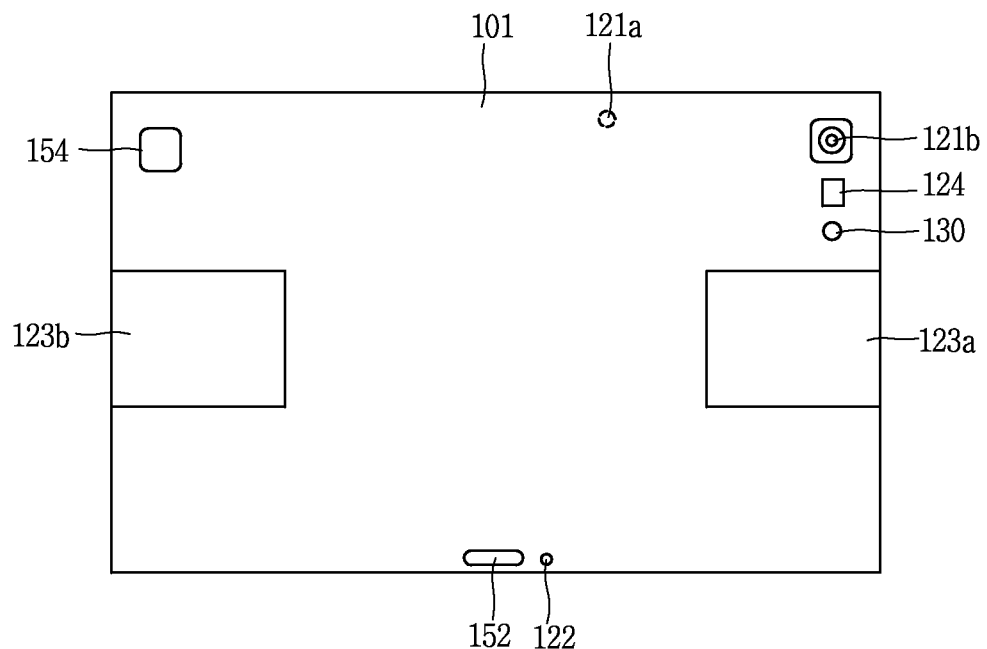

Referring now to FIGS. 2A and 2B, the portable electronic device 100 is described with reference to a bar-type body of the portable electronic device. However, the portable electronic device 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device (for example, bar-type, watch-type, glasses-type, and the like). However, such teachings with regard to a particular type of portable electronic device will generally apply to other types of portable electronic devices as well.

The portable electronic device 100 will generally include a case (for example, frame, housing, cover, and the like) forming the appearance of the portable electronic device. The portable electronic device 100 may include a case 101. The case 101 may include a front case and a rear case. Various electronic components are incorporated into a space formed between the front case and the rear case. At least one middle case may be additionally positioned between the front case and the rear case.

The case 101 may be configured to be deformable together with the flexible display unit 151 by an external force, taking into account characteristics of the flexible display unit 151. That is, the flexible display unit 151 is formed to be bendable or foldable together with the case 101.

For instance, the case 101 may be formed of a deformable material such as plastic, thin glass, fiber, thin metal (e.g., aluminum, etc.), textile and silicon, or a combination thereof.

The case 101 may be partially formed of a dielectric material or a low conductive material, and at least part of a structure of the case 101 may be formed of metal.

The flexible display unit 151 may be disposed on a front surface of the body of the portable electronic device to output information. As shown, the flexible display unit 151 may be mounted to the case 101 to form the front surface of the body of the portable electronic device.

In some embodiments, electronic components may also be mounted to the rear case. Examples of such electronic components include a detachable battery, an identification module, a memory card, and the like. Rear cover is shown covering the electronic components, and this cover may be detachably coupled to the rear case. Therefore, when the rear cover is detached from the rear case, the electronic components mounted to the rear case are externally exposed. In some embodiments, the rear cover may include an opening for externally exposing the camera 121 or the audio output module 152.

As an alternative to the example in which the plurality of cases form an inner space for accommodating components, the portable electronic device 100 may be configured such that one case forms the inner space. In this example, a portable electronic device 100 having a uni-body is formed in such a manner that synthetic resin or metal extends from a side surface to a rear surface.

If desired, the portable electronic device 100 may include a waterproofing unit (not shown) for preventing introduction of water into the body of the portable electronic device. For example, the waterproofing unit may include a waterproofing member which is located between the display unit 151 and the front case, between the front case and the rear case, or between the rear case and the rear cover, to hermetically seal an inner space when those cases are coupled.

FIGS. 2A and 2B depict certain components as arranged on the portable electronic device. However, it is to be understood that alternative arrangements are possible and within the teachings of the instant disclosure. Some components may be omitted or rearranged. For example, the first manipulation unit 123a may be located on another surface of the body of the portable electronic device, and the second audio output module 152b may be located on the side surface of the body of the portable electronic device.

As shown in FIG. 2A, the display unit 151 may be arranged on a front surface of the portable electronic device 100. The display unit 151 is generally configured to output information processed in the portable electronic device 100. For example, the display unit 151 may display execution screen information of an application program executing at the portable electronic device 100 or user interface (UI) and graphic user interface (GUI) information in response to the execution screen information.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be configured to be deformable by an external force. This deformation may include any of curving, bending, folding, twisting, rolling, and combinations thereof. The deformable display unit 151 may also be referred to as a "flexible display unit" or a "bendable display unit". In some implementations, the flexible display unit 151 may include a general flexible display, electronic paper (also known as e-paper), and combinations thereof. The flexible display unit means a display unit which is formed to be flexible so that at least part thereof can be folded.

In general, the flexible display unit is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 151 is not deformed (for example, in a state with an infinite radius of curvature and referred to as a first state), a display region of the flexible display unit 151 includes a generally flat surface. When in a state that the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 151 may be a curved state (for example, a state of being curved from up to down or from right to left), instead of being in flat state. In this embodiment, when an external force is applied to the flexible display unit 151, the flexible display unit 151 may transition to the second state such that the flexible display unit is deformed into the flat state (or a less curved state) or into a more curved state.

If desired, the flexible display unit 151 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. The touch sensor may be disposed on a substrate of the display unit, or in the display unit.

The flexible display unit 151 may form a touch screen together with a touch sensor. In this case, the touch screen may serve as the user input unit 123 (refer to FIG. 1A).

A cause to generate a state conversion of the flexible display unit 151 is not limited to an external force. For instance, when the flexible display unit 151 is in a flat state (first state), the flexible display unit 151 may be deformed to a deformed state (second state) by a user's command or application command. More specifically, the portable electronic device 100 is provide with a driving unit (not shown). If the current condition corresponds to a preset condition, the first state may be changed into the second state by the driving unit, not by an external force.

One option is to configure the portable electronic device 100 to include a deformation sensor which senses the deforming of the flexible display unit 151. The deformation sensor may be included in the sensing unit 140 (refer to FIG. 1).

The deformation sensor may be located in the flexible display unit 151 or the case 101 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Other possibilities include most any type of information which can be sensed in response to the curving of the flexible display unit or sensed while the flexible display unit 151 is transitioning into, or existing in, the first and second states.

In some embodiments, controller 180 or other component can change information displayed on the flexible display unit 151, or generate a control signal for controlling a function of the portable electronic device 100, based on the information related to the deforming of the flexible display unit 151. Such information is typically sensed by the deformation sensor.

For instance, if the flexible display unit 151 is bent in correspondence to an external force, the controller 180 may rearrange, separate, synthesize or change a curvature of a screen image which has been displayed on the flexible display unit 151, according to a bent direction of the flexible display unit, a bent degree, and a restoration acceleration. More specifically, if the flexible display unit 151 is inward bent by an external force, the controller 180 may control screen images displayed on the flexible display unit, to be adjacent to each other. On the other hand, if the flexible display unit 151 is outward bent by an external force, the controller 180 may control screen images displayed on the flexible display unit, to be distant from each other.

The portable electronic device 100 is shown having a case 101 for accommodating the flexible display unit 151. The case 101 can be deformable together with the flexible display unit 151, taking into account the characteristics of the flexible display unit 151. That is, the flexible display unit 151 is formed to be bendable together with the case 101.

As shown in FIG. 2B, as another example of the user input unit 123, one rear input unit or a plurality of rear input units 123a and 123b may be located on the rear surface of the case 101 of the portable electronic device. The rear input units 123a and 123b can be manipulated by a user to provide input to the portable electronic device 100. The input may be used in a variety of different ways. For example, the rear input unit may be used by the user to provide an input for power on/off, start, end, scroll, control volume level being output from the audio output unit 152, switch to a touch recognition mode of the flexible display unit 151, and the like. The rear input unit may be configured to permit a touch input, a push input, or combinations thereof.

The rear input units 123a and 123b may be located to overlap the flexible display unit 151 of the front side in a thickness direction of the body of the portable electronic device. As one example, the rear input units 123a and 123b may be located on a rear surface of the portable electronic device 100 in a flat state of the case 101. However, when the case 101 is bent so that a left end and a right end thereof can face each other, the rear input units 123a and 123b may be located on a front surface of the portable electronic device 100. However, the present invention is not limited to this. That is, a position and the number of the rear input units may be variable.

As a further alternative, the portable electronic device 100 may include a finger scan sensor which scans a user's fingerprint. The controller 180 can then use fingerprint information sensed by the finger scan sensor as part of an authentication procedure. The finger scan sensor may also be installed in the flexible display unit 151 or implemented in the user input units 123a and 123b.

The microphone 122 is shown located at an end of the portable electronic device 100, but other locations are possible. If desired, multiple microphones may be implemented, with such an arrangement permitting the receiving of stereo sounds.

The second camera 121b is shown located at the rear side of the body of the portable electronic device. Although not shown, in a case where the first camera 121a is arranged on a front surface of the body, the second camera 121b has an image capturing direction that is substantially opposite to the image capturing direction of the first camera unit 121a.

The first camera 121a may be arranged at an opening formed at part of the flexible display unit 151. Alternatively, the first camera 121a may be arranged at an opening formed at part of the case disposed on a front surface.

The second camera 121b is configured to process an image frame of still images or moving images acquired by an image sensor in a capturing mode or a video call mode. The processed image frame may be displayed on the flexible display unit 151, and may be stored in the memory 170.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the second camera 121b, the flash 124 may illuminate the subject.

The electromagnetic wave generation unit 130 may be disposed close to the second camera 121b. When the second camera 121b is activated, the electromagnetic wave generation unit 130 emits generated electromagnetic waves.

At least one antenna for wireless communication may be located on the body of the portable electronic device. The antenna may be installed in the body of the portable electronic device or formed by the case. For example, an antenna which configures a part of the broadcast receiving module 111 (refer to FIG. 1A) may be retractable into the body of the portable electronic device. Alternatively, an antenna may be formed using a film attached to an inner surface of the rear cover, or a case that includes a conductive material.

An optical output module 154 can output a signal for indicating an event generation using light of a light source. Examples of events generated in the portable electronic device 100 may include message reception, call signal reception, a missed call, an alarm, a schedule notice, an email reception, information reception through an application, and the like. The controller 180 may control the optical output module 154 such that output of light is completed, when an event check by a user is sensed.

A battery (not shown) located in the portable electronic device 100 may also be deformable in cooperation with the flexible display unit 151, taking into account the characteristic of the flexible display unit 151. One technique to implement such a battery is to use a stack and folding method of stacking battery cells.

Although not shown, the interface unit 160 (refer to FIG. 1) may be disposed on a side surface of the portable electronic device. The interface unit 160 may serve as a path allowing the portable electronic device 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the portable electronic device 100. The interface unit 160 may be implemented in the form of a socket for accommodating an external card, such as Subscriber Identification Module (SIM), User Identity Module (UIM), or a memory card for information storage.

A battery (not shown) may receive power via a power source cable connected to the interface unit 160. Also, the battery can be recharged in a wireless manner using a wireless charger. Wireless charging may be implemented by magnetic induction or electromagnetic resonance.

The portable electronic device 100 according to an embodiment of the present invention, which can include at least one of the above components, may be configured as a new form factor which can be folded and unfolded like a book. More specifically, the portable electronic device may serve as a flexible electronic device of which body is entirely folded and unfolded, despite of a length change occurring according to layer in a thickness direction when the portable electronic device is folded.

Hereinafter, a structure of a flexible display unit, and a structure of a flexible electronic device related to transformation of the flexible display unit will be explained in more detail with reference to the attached drawings.

Firstly, an external structure of the portable electronic device 100 according to an embodiment of the present invention will be explained.

Figure 3A:
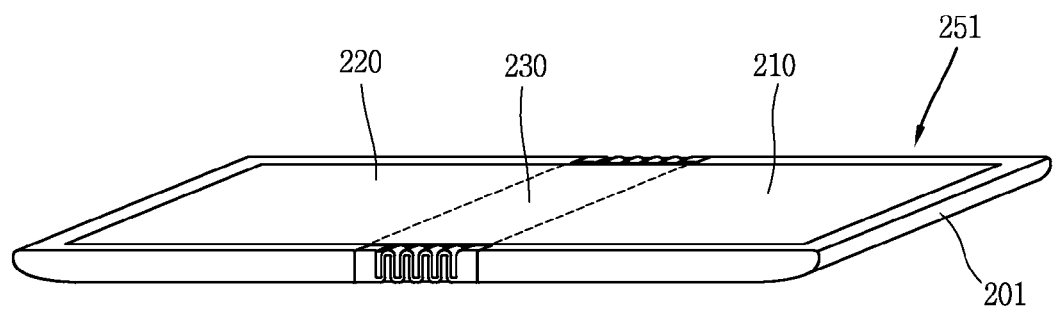
FIG. 3A is a front perspective view of a portable electronic device according to an embodiment of the present invention, which illustrates that a display unit forms a single planar surface.
Figure 3B:
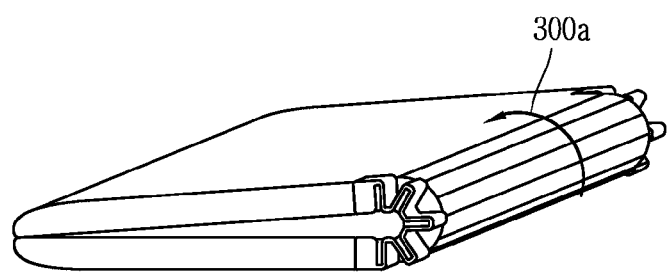
FIG. 3B is a conceptual view illustrating a folded state of a folding region of the display unit in the portable electronic device of FIG. 3A.

FIG. 3A is a front perspective view of a portable electronic device according to an embodiment of the present invention, which illustrates that a display unit forms a single planar surface. FIG. 3B is a conceptual view illustrating a folded state of a folding region of the display unit in the portable electronic device of FIG. 3A.

Referring to the drawings, the portable electronic device includes a case which forms the appearance of the portable electronic device, a flexible display unit 251 disposed on a front surface of the portable electronic device, and a sensing unit (refer to 140 of FIG. 1, or transformation sensing means) configured to sense a transformation of the flexible display unit 251.

The flexible display unit 251 can be bent or folded. Folding means a state that a curvature radius of part of a body of the portable electronic device is smaller than a reference value, i.e., a folded state. For such folded state of the portable electronic device, screens of the flexible display unit 251 contact each other or are positioned close to each other.

On the contrary, the bending means a state that a curvature radius of part of the body of the portable electronic device is larger than the reference value, i.e., a bent state.

The folding and bending may be differentiated from each other according to a bent degree. For instance, if the portable electronic device is bent at an angle larger than a predetermined value, the state may be defined as 'folding'. On the contrary, if the portable electronic device is bent at an angle equal to or smaller than the predetermined value, the state may be defined as 'bending'. Even if the portable electronic device is bent at an angle larger than a predetermined value, if a curvature radius is larger than the reference value, the state may be also defined as 'bending'. Hereinafter, such bending and folding will be referred to as 'bending' for convenience.

When the flexible display unit 251 forms a single planar surface, at least part of the flexible display unit 251 may be transformed. For instance, the transformed state may be a folded state of the flexible display unit 251. That is, the flexible display unit 251 may be configured to be in a first state where a specific region is flat (refer to FIG. 3A), and a second state where a specific region has been folded in the form of a curved surface.

In this instance, the specific region folded in the second state may be defined as a folding region 230. Referring to FIG. 3B, the flexible display unit 251 may include a first region 210 and a second region 220 distinguished from each other by the folding region 230. More specifically, the folding region 230 of the flexible display unit 251 may be a region disposed between the first region 210 and the second region 220. The first region 210 may be disposed at one side of the flexible display unit 251, and the second region 220 may be disposed at another side of the flexible display unit 251. Thus, the folding region 230 may be a middle portion of the flexible display unit 251, not an edge region of the flexible display unit 251. The folding region 230 may be long formed in one direction, and may be configured so that its entire part can be constantly transformed.

In this instance, an entire part of the body of the portable electronic device may be transformed together with the flexible display unit 251.

The portable electronic device may be configured so that only the folding region 230 can be flexible. In this instance, the portable electronic device may be configured so that the folding region can be bent or folded while the first region 210 and the second region 220 are not flexible.

Referring to FIG. 3B with FIG. 3A, the portable electronic device may be formed to be foldable based on the folding region 230. That is, the flexible display unit 251 may be rotatable and bendable based on the folding region 230. For instance, a right end (first region) of the body of the portable electronic device may be bendable or transformable by rotating in a first arrow direction 300a, based on the folding region 230. In this instance, the first region 210 and the second region 220 may be foldable on each other, which can implement a foldable display.

In this instance, the folding region 230 may be in a folded state along a curved path. The curved path may be part on a circumference of a circle, or may be part on a circumference of an oval.

The flexible display unit 251 may be provided with a plurality of folding regions. In this instance, the portable electronic device can provide a dual foldable display as a left end and a right end of the body are folded.

As aforementioned, the portable electronic device of the present invention may be configured to be foldable based on the folding region 230. Hereinafter, a control operation with respect to folding of the folding region, and a structure mechanism will be explained in more detail.

Figure 4A:
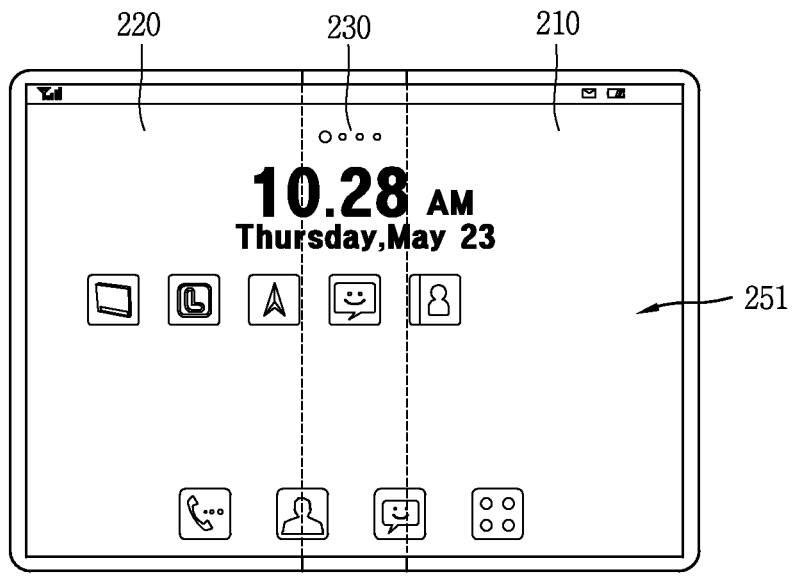
FIGS. 4A to 4C are conceptual views illustrating an operation to control a portable electronic device according to an embodiment of the present invention.
Figure 4B:
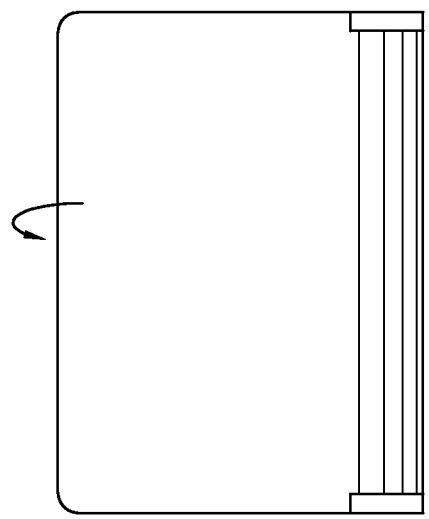
Figure 4C:
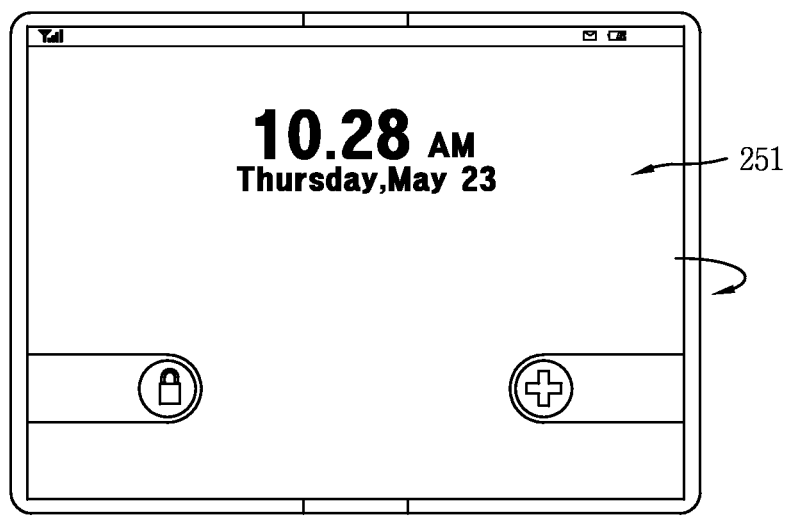

Firstly, an operation to control the portable electronic device when a specific region of the flexible display unit is transformed, will be explained with reference to FIGS. 4A to 4C. FIGS. 4A to 4C are conceptual views illustrating an operation to control a portable electronic device according to an embodiment of the present invention.

Referring to FIGS. 4A to 4C, the portable electronic device can perform various control operations by a state conversion from a first state where the folding region 230 has been unfolded, into a second state where the first region 210 and the second region 220 have been folded on each other.

For instance, referring to FIG. 4A, a home screen page may be output to the flexible display unit 251. The home screen page may include one or more objects, and the object may be an icon or widget of an application installed at the portable electronic device. The home screen page may be output to part including the first region 210, the second region 220 and the folding region 230 of the flexible display unit 251. However, the present invention is not limited to this. The first region 210 and the second region 220 may be distinguished from each other by having different types of graphic user interfaces (GUIs) by making different types of information displayed thereon.

When the portable electronic device is converted into the second state as shown in FIG. 4B, the flexible display unit 251 may be deactivated. In this instance, the flexible display unit 251 may be deactivated, and a lock mode where reception of a control command by a user is restricted may be executed.

The controller 180 senses a state conversion of the flexible display unit 251 using the sensing unit 140 (refer to FIG. 1). More specifically, if the flexible display unit 251 is converted to the second state from the first state as an external force is applied thereto, the sensing unit 140 senses such transformation of the flexible display unit 251.

The transformation may be performed by an external force applied onto the flexible display unit 251, and the external force may be applied by a user or other object.

If the portable electronic device is re-converted into the first state from the second state as shown in FIG. 4C, the controller 180 activates the flexible display unit while maintaining the lock mode. Thus, a lock screen for inputting a password may be displayed on the flexible display unit 251.

When one or more events have occurred from one or more applications in the second state, the controller 180 (refer to FIG. 1) outputs information on the event to the folding region 230 (refer to FIG. 4C). In this embodiment, the information on the event is information notifying arrival of a text message, which may be content of a simple text message. In this instance, content of a text message may be displayed on a screen of the folding region for a predetermined time, and then may disappear. As another example, content of an output message may disappear according to a user's input. Under such driving method, an activation control and a locked-state control with respect to the flexible display unit can be implemented by folding and unfolding the flexible display unit.

Hereinafter, a hardware configuration of the portable electronic device which performs the operations of FIGS. 4A to 4C will be explained in more detail.

Figure 5A:
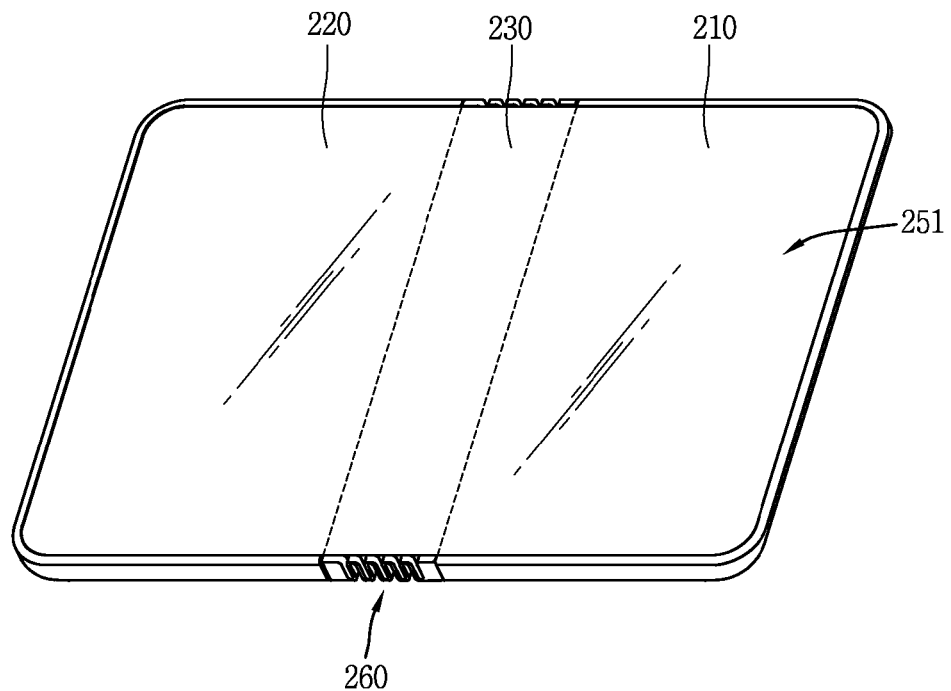
FIGS. 5A and 5B are front and rear perspective views of a portable electronic device according to an embodiment of the present invention.
Figure 5B:
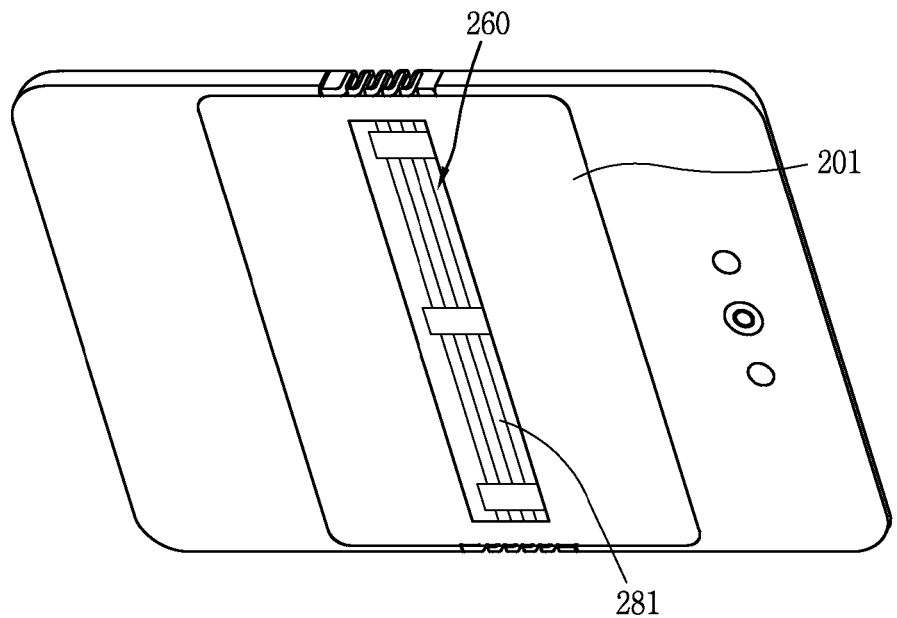
Figure 6:
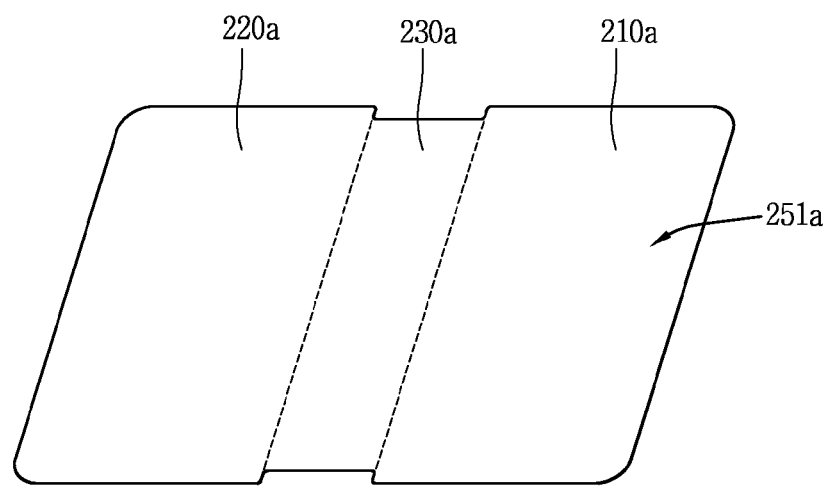
FIG. 6 is a disassembled view of the portable electronic device of FIG. 5A.
Figure 6:
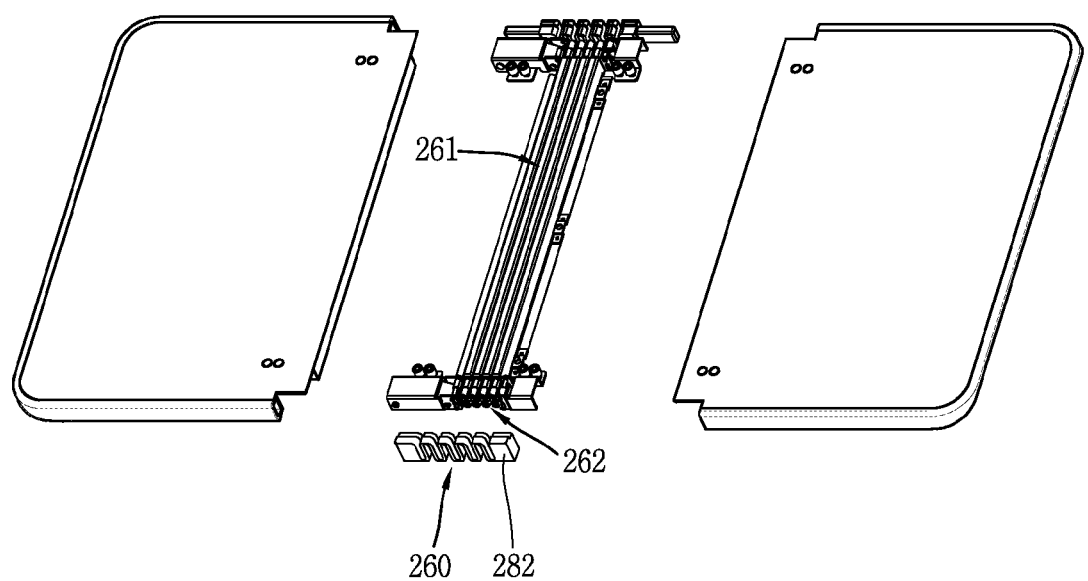
Figure 7A:
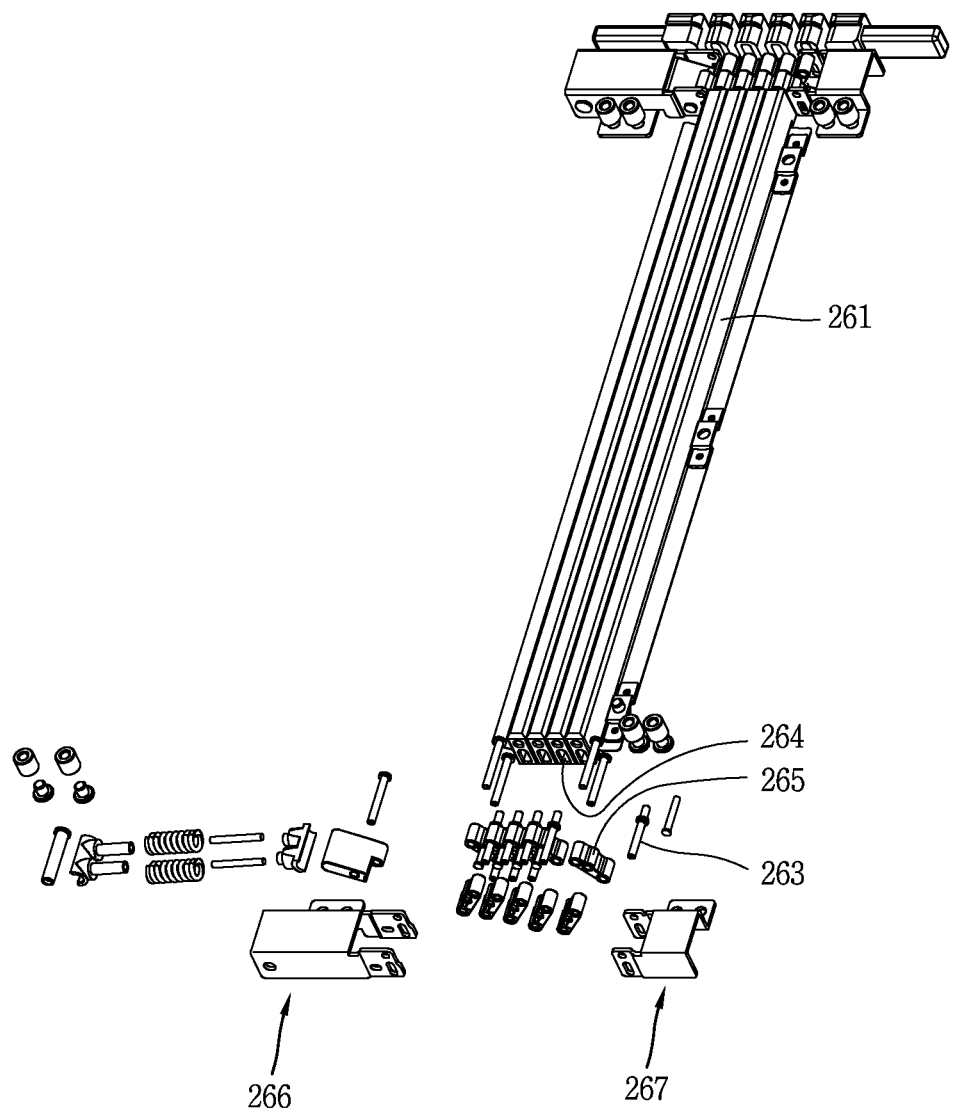
FIGS. 7A and 7B are disassembled-enlarged views of a folding unit of FIG. 6.
Figure 7B:
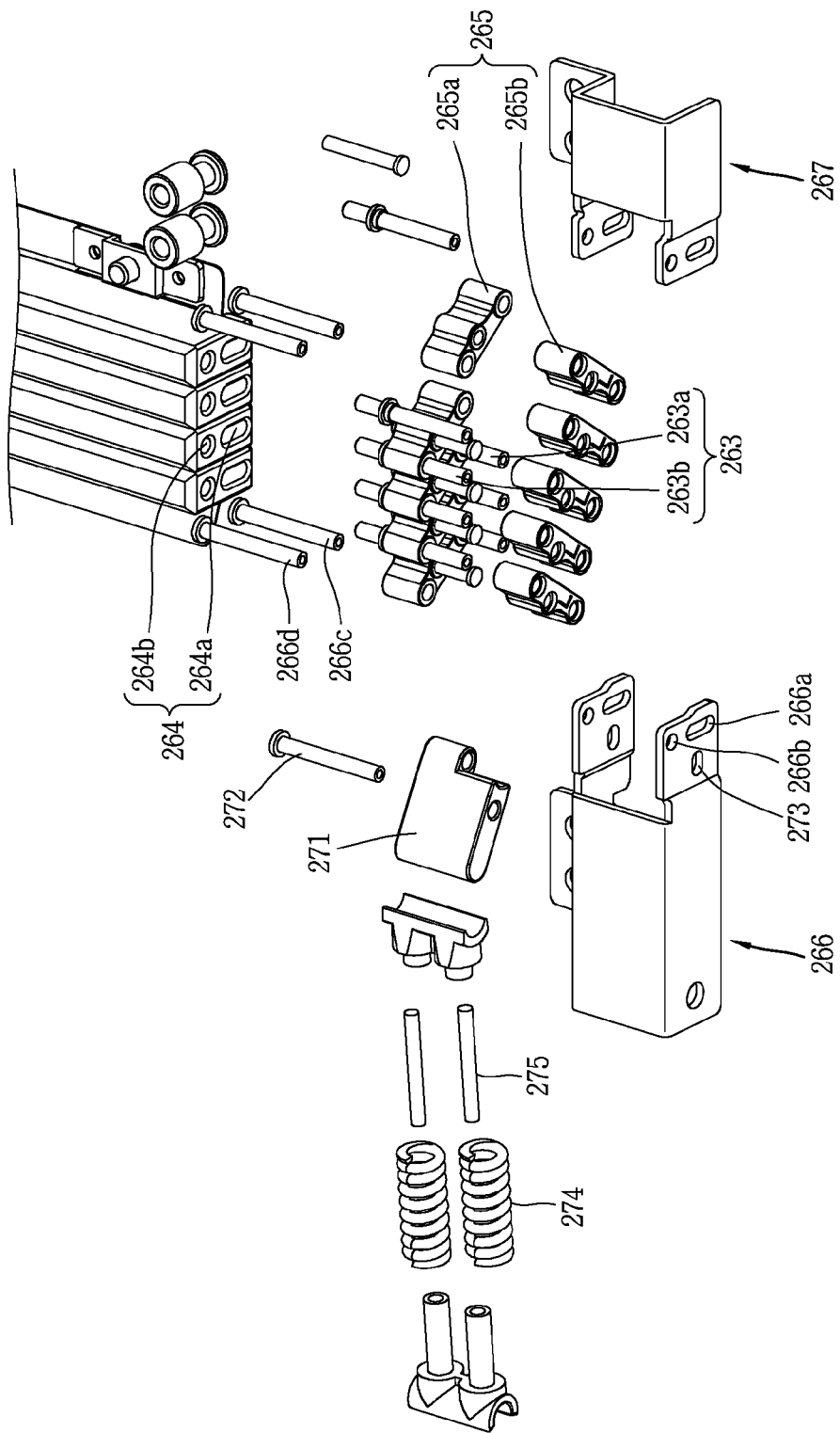
Figure 7C:
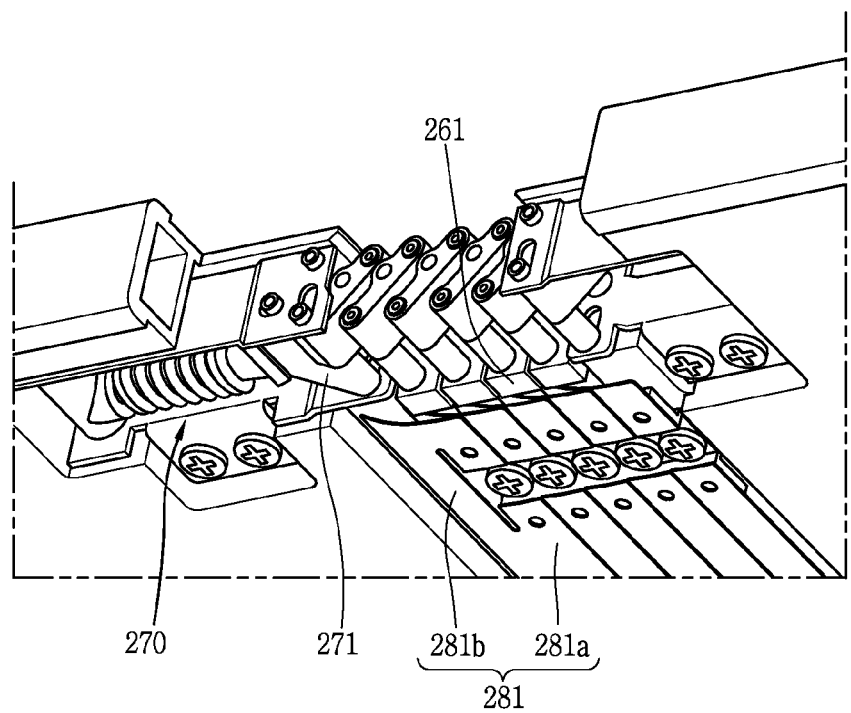
FIGS. 7C and 7D are partially-enlarged view of the folding unit.
Figure 7D:
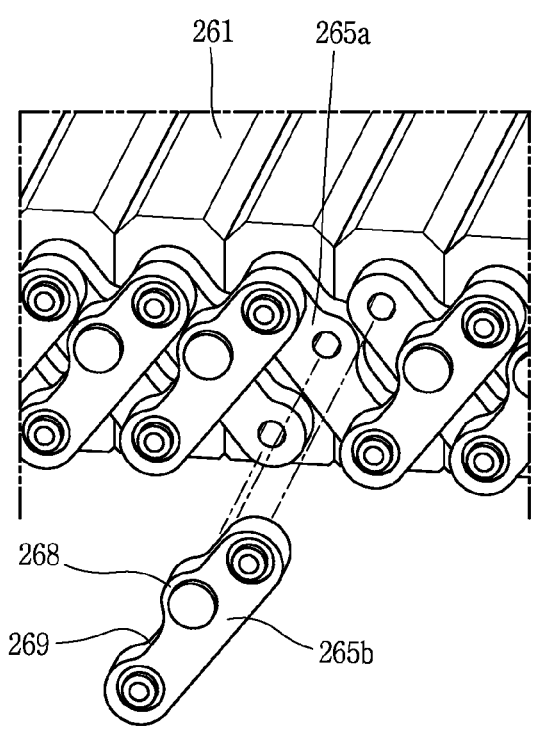
Figure 7E:
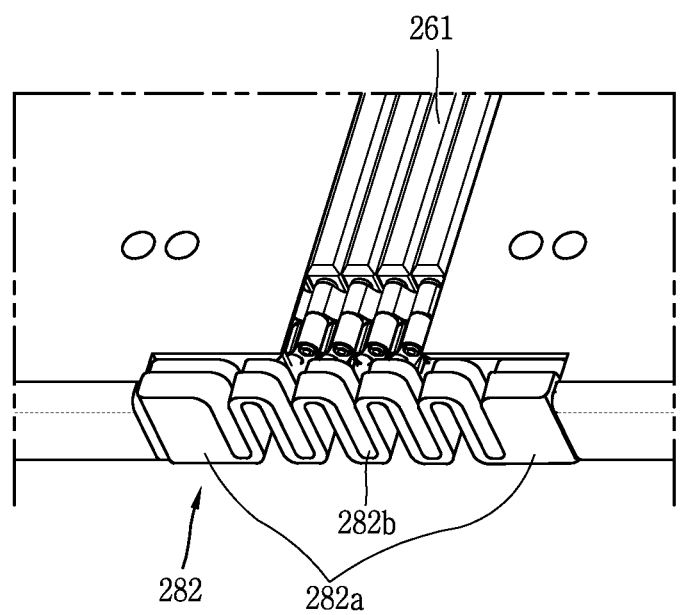
FIG. 7E is an enlarged view of a cover of FIG. 6.
Figure 8A:
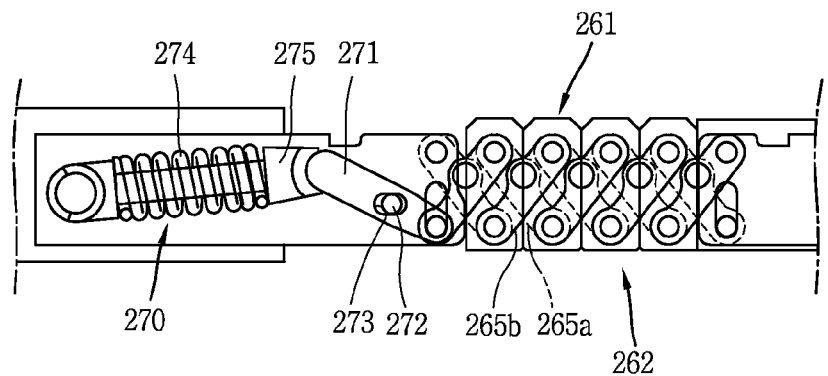
FIGS. 8A(a) to 8A(c) are partially-enlarged views illustrating folding processes of the portable electronic device of FIG. 5.
Figure 8A:
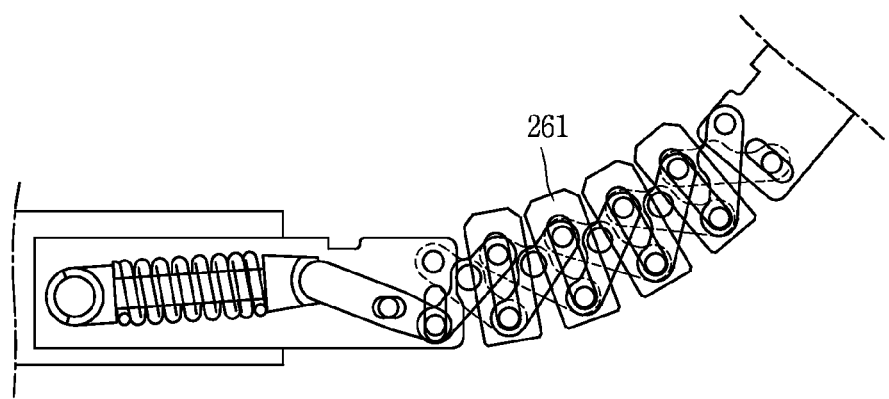
Figure 8A:
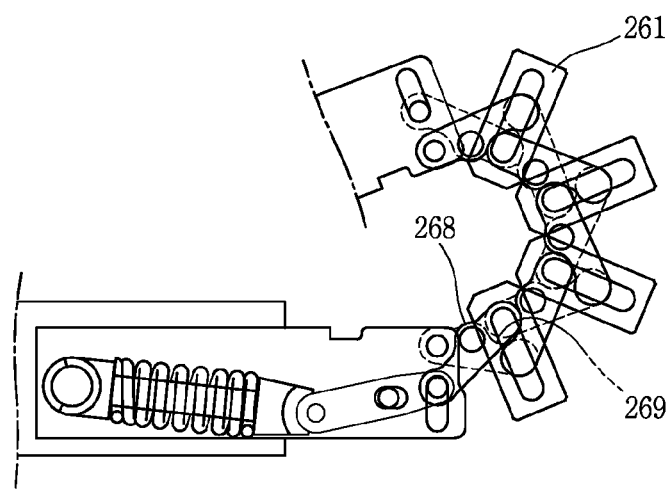
Figure 8B:
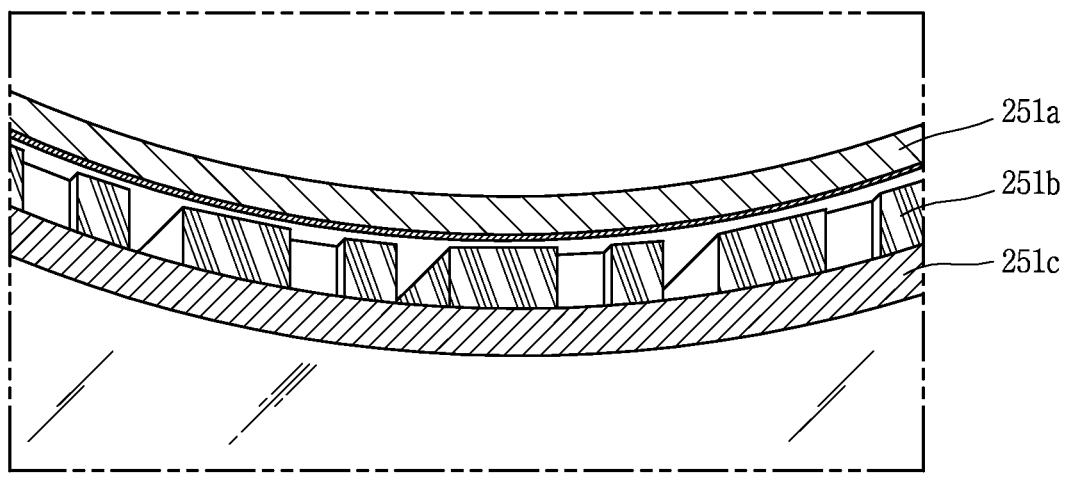
FIG. 8B is an enlarged sectional view of a flexible display unit of FIG. 8A(b)

FIGS. 5A and 5B are front and rear perspective views of a portable electronic device according to an embodiment of the present invention. FIG. 6 is a disassembled view of the portable electronic device of FIG. 5A. FIGS. 7A and 7B are disassembled-enlarged views of a folding unit of FIG. 6. FIGS. 7C and 7D are partially-enlarged view of the folding unit. FIG. 7E is an enlarged view of a cover of FIG. 6. FIGS. 8A(a) to 8A(c) are partially-enlarged views illustrating folding processes of the portable electronic device of FIG. 5. FIG. 8B is an enlarged sectional view of a flexible display unit of FIG. 8A(b).

Referring to the drawings, the body of the portable electronic device is provided with a front surface, a rear surface and side surfaces, and the flexible display unit 251 is disposed on the front surface. FIGS. 5A to 7E illustrate a first state where the flexible display unit 251 is flat, and FIGS. 8A(a) to 8A(c) illustrate a second state where the folding region 230 (refer to FIG. 3A) of the flexible display unit 251 has been folded in the form of a curved surface.

Referring to FIGS. 5A and 5B, a case is disposed on the rear surface of the portable electronic device. The case may serve as a rear cover 201 which forms the rear surface of the body. The rear cover 201 may be formed to be flexible so as to be transformed by an external force.

The rear cover 201 may be formed of a transformable material such as plastic, thin glass, fiber, thin metal (e.g., aluminum, etc.), textile and silicon, or a combination thereof. Further, the rear cover 201 may be formed of a transmissive material such as polyethylene terephthalate (PET) film and thin glass. In this instance, the flexible display unit 251 may be a display unit having optical transmittance. And information output to the flexible display unit 251 may be exposed to the outside through the rear cover 201, even at a rear surface of the portable electronic device.

However, the present invention is not limited to this. The case may be further provided with other cover rather than the rear cover, or cases. For instance, as a front case which forms at least part of the front surface of the body is coupled to a rear case which forms at least part of the rear surface of the body, a space for mounting electronic components can be formed. Further, the rear cover for covering mounted electronic components can be detachably coupled to the rear case.

As shown, electronic components may also be mounted to the rear cover 201. Examples of such electronic components include a detachable battery, an identification module, a memory card, and the like. In some embodiments, the rear cover 201 may include an opening for externally exposing the camera 121 or the optical output module 154 (refer to FIG. 2A).

One or more rear input units 123a and 123b (refer to FIG. 2B) may be provided on a rear surface of the portable electronic device. The rear input units 123a and 123b can be manipulated by a user to provide input to the portable electronic device 100. The input may be used in a variety of different ways.

For instance, the rear input units may be configured to receive a touch input, a push input or a combination thereof. In conclusion, the rear input units may be configured to receive both a touch input and a push input. In some cases, the rear input units may serve as a touch sensor of the flexible display unit 251, and a home key of the portable electronic device.

The rear input units may be disposed at positions close to right and left ends of the portable electronic device. Under such configuration, in a folded state of the portable electronic device, the rear input unit positioned on at least one rear surface may be positioned on a front surface.

The flexible display unit 251 may include a flexible display device such as a plastic OLED display and a micro LED display. Although not shown, the display device may be covered by an additional window. For instance, the window may be formed of a transmissive and flexible material, such as a polyethylene terephthalate (PET) film or thin glass. However, the window may include a non-transmissive region. A transmissive region of the window may have an area corresponding to the display device. Accordingly, a user can recognize visual information output from the display unit 251, from outside.

A touch sensor (not shown), configured to sense a touch input applied to the window, may be disposed between the window and the display device.

For instance, the touch sensor may be mounted to a rear surface of the window. In this case, the touch sensor is additionally provided. As another example, the touch sensor may be integrally provided with the display device. In this case, the display device may be a touch-sensible display device. The touch sensor may be formed to be transmissive, and is configured to convert change occurring from a specific part of the window (e.g., a voltage and a capacitance) into an electrical input signal so as to sense a touch input. Further, the touch sensor may be also configured to sense not only a touched position and a touched area, but also touch pressure and/or touch capacitance.

The window, the touch sensor, and the display device may be configured as the flexible display unit 251. In this case, the flexible display unit 251 is operated as a flexible touch screen.

Referring to the drawings, the flexible display unit 251 is provided with a front surface and a rear surface, and a folding unit 260 is formed at the rear surface of the flexible display unit 251. The folding unit 260 may be configured to be foldable together with the flexible display unit 251, and may be arranged at a position corresponding to the aforementioned folding region 230 (refer to FIG. 3A).

More specifically, the folding unit 260 includes a plurality of blocks 261. For instance, the plurality of blocks 261 are overlapped with each other on a rear surface of the flexible display unit 251, and at least part of the plurality of blocks 261 is arranged so as to be relative-movable with respect to neighboring blocks to a direction to become far from or close to the neighboring blocks.

Referring to FIGS. 5A, 5B, 6, 7A and 7B, the plurality of blocks 261 are configured as long bars formed in one direction. For instance, the plurality of blocks 261 are formed to extend along one edge of the flexible display unit 251, and they are parallel to each other in a first state where the flexible display unit 251 is flat.

The plurality of blocks 261 may have a rectangular cylinder shape so that both side surfaces and a bottom surface can have a quadrangular shape. In this instance, a side surface of one block may be arranged to face a side surface of another neighboring block. The plurality of blocks 261 may be long formed in a first direction parallel to short edges of the flexible display unit 251, and may be sequentially arranged in a second direction perpendicular to long edges of the flexible display unit 251. The plurality of blocks 261 may have a separation distance therebetween in the second direction. For change of the separation distance, the plurality of blocks are formed such that at least part thereof is relatively-movable to a direction to become far from or close to neighboring blocks. The plurality of blocks 261 may be formed of a material having a strength high enough to move the blocks 261, rather than to transform the blocks 261 on their own position. For instance, the plurality of blocks 261 may be formed of plastic, glass, fiber, metal (e.g., aluminum, magnesium, etc.), or a combination thereof.

For instance, the plurality of blocks 261 may have a greatest thickness among components laminated on the folding region 230. In this embodiment, the plurality of blocks 261 may be formed of magnesium having a light weight but high intensity for a great thickness.

As another example, the plurality of blocks 261 may be formed of a transmissive material such as polyethylene terephthalate (PET) film and thin glass. In this instance, the flexible display unit 251 may be a display unit having an optical transmittance. Information output to the flexible display unit 251 may be exposed to the outside even from a rear surface of the portable electronic device, through the plurality of blocks 261.

Referring to FIGS. 8A(a) to 8A(c) together with FIGS. 5A to 7E, the plurality of blocks 261 are configured so that at least part thereof can perform a relative motion with respect to neighboring blocks to a direction to become far from the neighboring blocks, when the flexible display unit 251 is converted to the second state from the first state. More specifically, at least part of the plurality of blocks 261 performs a relative motion with respect to neighboring blocks, to a direction to become far from the neighboring blocks during a folding operation, so that the first state can be converted to the second state. Thus, a separation distance between the plurality of blocks 261 in the second state may be greater than that in the first state.

As shown, the plurality of blocks 261 are arranged along a curved path. Thus, the first region 210 and the second region 220 of the flexible display unit 251 may be spaced from each other in the second state. The separation degree may be greater toward the folding unit from two edges of the portable electronic device. For such operation, a separation distance between the blocks adjacent to each other in the second state may be variable in a direction passing through the flexible display unit 251 (or a thickness direction of the portable electronic device).

For instance, a side surface of one block is parallel to a side surface of another neighboring block in the first state. In this instance, the side surfaces facing each other may directly contact each other. On the other hand, a side surface of one block faces a side surface of another neighboring surface with an acute angle, in the second state. That is, in the second state, a separation distance between the plurality of blocks 261 becomes greater toward a region farther from the flexible display unit 251 in the thickness direction. That is, a separation distance between the plurality of blocks 261 becomes shorter toward a region closer to the flexible display unit 251. Further, the plurality of blocks 261 are configured so that at least part thereof can perform a relative motion with respect to neighboring blocks in a direction to become close to each other when the flexible display unit 251 is converted to the first state from the second state.

When an object having a thickness is folded, a length change occurs according to layer. Thus, if the body of the portable electronic device is together folded when the flexible display unit is folded, the body should have its length change compensated. Further, the length change should be compensated so that the flexible display unit can have its rear surface as a smooth curved surface when folded.

In this embodiment, the length change can be solved as the plurality of blocks 261 perform a relative motion with respect to each other. This can implement a novel form factor hinge which can be folded and unfolded like a book. The present invention provides a mechanism for applying a force to the plurality of blocks 261 for a relative motion of the blocks 261. Such mechanism will be explained in more detail.

The folding unit 260 includes a connection unit 262 configured to connect the plurality of blocks 261 to each other.

The plurality of blocks 261 may be configured so that one end thereof can be tilted based on a connection shaft 263 of the connection unit 262 when the flexible display unit 251 is converted to the second state from the first state. More specifically, a connection groove 264 for inserting the connection shaft 263 thereinto is provided at each end of the plurality of blocks 261. The connection groove 264 may be configured as a slit long formed in one direction, such that the connection shaft 263 is movable in the connection groove 264.

The connection unit 262 is provided with links 265 connected to the respective ends of the blocks 261 so as to be relative-movable with respect to each other.

The connection shaft 263 may be configured as a rivet coupled to the link by a punch, and the links 265 are rotated by being engaged with each other in a connected state by the rivets. In this instance, the links are moved in the blocks when the folding unit 260 performs a trajectory motion.

In this instance, at least part of the links 265 is configured to sequentially connect one side and another side of the blocks 261 to each other. For this, the connection shaft 263 is provided with a first connection shaft 263a for connecting at least part of the links 265 to the one side, and a second connection shaft 263b for connecting at least part of the links 265 to the another side. The connection groove 264 may include a first connection groove 264a connected to the first connection shaft 263a at the one side, and a second connection groove 264b connected to the second connection shaft 263b at the another side. The first connection groove 264a is arranged at a position farther from the flexible display unit than the second connection groove 264b. And the first connection groove 264a may be configured as a slit long formed in one direction, such that the first connection shaft 263a is movable in the first connection groove 264a. On the other hand, the second connection grooves 264b may be formed in a circular shape such that the links 265 are rotated on their own position. However, the present invention is not limited to this. For instance, one connection groove may be configured as a slit, and a pair of connection shafts 263a and 263b may be connected to the one connection groove.

Under such configuration, the links positioned at a side far from the flexible display unit 251 perform a rotation motion and a sliding motion, while the links positioned at a side close to the flexible display unit 251 perform only a rotation motion. More specifically, under an assumption that at least part 265a of the links 265 belongs to a first group, the links may be provided with links 265b which belong to a second group. The links 265b of the second group are arranged to cross the links 265a of the first group. The links 265b of the second group are overlapped with the links 265a of the first group in a direction toward end portions of the plurality of blocks. Further, the links 265b of the second group are arranged to cross the links 265a of the first group, thereby being sequentially connected to upper and lower ends of the links 265a of the first group. In this instance, the links 265b of the second group may be connected to the links 265a of the first group by the connection shaft 263. Under such configuration, the links 265a of the first group and the links 265b of the second group may be inclined in opposite directions in the first state, based on the end portions of the plurality of blocks 261. The links 265a of the first group and the links 265b of the second group may be symmetric to each other in right and left directions, based on the ends of the plurality of blocks 261.

Thus, the links 265a of the first group and the links 265b of the second group cross each other. Further, the links 265a of the first group and the links 265b of the second group may be connected to each other at crossing parts thereof. The links 265 may be implemented as three-point links connected to each other at three parts. The folding unit 260 performs a trajectory motion with a constant 'IR' value, as the three-point links are connected to each other.

As shown, a first fixing portion 266 and a second fixing portion 267, disposed so that the plurality of blocks 261 can be interposed therebetween, are mounted to the body of the portable electronic device. Each of the first and second fixing portions 266 and 267 is implemented as a plate, and is mounted to the case of the portable electronic device. In this instance, links arranged at an outermost side among the links 265a of the first group may be connected to the first fixing portion 266, and the links arranged at an outermost side among the links 265b of the second group may be connected to the second fixing portion 267. In this instance, fixing portion connection grooves 266a and 266b are formed at each of the first and second fixing portions 266 and 267. Links arranged at an outermost side among the links 265a and 265b of the first and second groups may be connected to the fixing portion connection grooves 266a and 266b, through fixing portion connection shafts 266c and 266d. In this instance, the fixing portion connection groove 266a farther from the flexible display unit 251 than the fixing portion connection groove 266b may be configured as a slit, and the fixing portion connection groove 266b closer to the flexible display unit 251 than the fixing portion connection groove 266a may have a circular shape. The fixing portion connection groove 266a may be long formed in a thickness direction of the portable electronic device.

Under such configuration, the links positioned at a side far from the flexible display unit 251 perform a rotation motion and a sliding motion at the first and second fixing portions 266 and 267, while the links positioned at a side close to the flexible display unit 251 perform only a rotation motion. In this instance, the fixing portion connection shafts 266c and 266d serve as a guide of the links, and the ends thereof are moved within the blocks in a thickness direction of the portable electronic device, due to a shape of the fixing portion connection grooves 266a and 266b, when the folding unit 260 performs a trajectory motion.

Under the aforementioned structure of the blocks 261 and the connection unit 262, when a user folds the portable electronic device, the folding force is transmitted to the connection unit 262 and the blocks 261. As a result, the blocks perform a relative motion with respect to each other. This can allow a length change of the body to be compensated when the body of the portable electronic device is folded. If the case or a supporting member of the display device is formed of rubber in order to implement a folded state despite such length change, an empty space is generated on a rear surface of the flexible display unit 251. This may cause the flexible display unit 251 not to be supported, resulting in distortion or a rough surface of the flexible display unit 251. On the other hand, the aforementioned mechanism of the present invention can solve such problems.

The folding unit 260 is provided with a structure for maintaining a folded state in the second state. Referring to FIGS. 7D and 8A(c), the links 265b of the second group may be provided with protrusions 268 protruding between two ends of a link body, and the protrusions 268 may be rotatably connected to the links 265a of the first group by being arranged at the crossing parts. More specifically, the links 265b of the second group may include the protrusions 268, and grooves 269 formed between two ends of the link body. In this instance, the grooves 269 may be formed to accommodate therein end portions of the links 265b of the second group, in the second state where the flexible display unit 251 has been folded.

More specifically, the end portions of the links 265b of the second group are formed to have a circular shape, and the grooves 269 are formed to correspond to an outer circumference of the circular shape. The grooves 269 may be formed on a side surface of the links 265b of the second group, by the protrusions 268. However, the present invention is not limited to this. That is, the grooves 269 may be also provided at the links 265a of the first group.

In this instance, if the blocks perform a relative motion in the second state, in a direction to become far from each other, end portions of the links 265 far from the flexible display unit 251 move toward the flexible display unit 251, whereas end portions of the links 265 close to the flexible display unit 251 rotate on their own position. This may increase an inclined degree of the links 265 in the second state, with respect to the ends of the blocks 261. Under such configuration, the end portions of the links 265b of the second group may be accommodated in the grooves 269 in the second state. Under such structure, the second state can be maintained even if an external force is applied to the portable electronic device toward a direction rather than an unfolding direction.

Referring to FIGS. 6, 7B, 7C and 8A, the portable electronic device may further include a pressing module 270 configured to apply a force to the plurality of blocks 261, in the first state where the flexible display unit 251 is flat, toward a direction which makes the blocks 261 move close to each other. In this instance, the pressing module 270 is formed to apply a force to a region adjacent to one end of the plurality of blocks 261, in a direction passing through the flexible display unit 251.

Further, the pressing module 270 may be formed such that a force-applied direction is changed as the folding unit 260 is folded. For instance, a force-applied direction is changed while the portable electronic device is folded, such that a force to maintain a first state is generated in the first state, and a force to maintain a second state is generated in the second state. Such mechanism may be implemented by a structure to be explained in the following descriptions.

For instance, one of the first and second fixing portions 266 and 267 may be provided with an auxiliary link 271 connected to links arranged at an outermost side among the links 265b of the second group. An auxiliary groove 273 for inserting an auxiliary shaft 272 inserted into the auxiliary link 271 may be formed at the fixing portion implemented as a plate. The pressing module 270 is provided with a spring 274 for applying a force to the auxiliary link 271. The spring 274 may be implemented as a compression spring for applying a pushing force to the auxiliary link 271 in the first state.

The auxiliary link 271 is connected to links arranged at an outermost side among the links 265b of the second group, at one side of the blocks (a side farther from the flexible display unit), through a connection shaft. The auxiliary link 271 may be arranged in a direction crossing the links 265b of the second group in the first state. For instance, the auxiliary link 271 may be arranged so as to be inclined with respect to end portions of the blocks, in the same direction as the links 265a of the first group, in the first state. The spring 274 may be inserted into a spring supporting portion 275. One end of the spring supporting portion 275 may be rotatably coupled to the fixing portion, and another end thereof may be rotatably coupled to the auxiliary link 271.

As shown, the auxiliary link 271 may be arranged at a side far from the flexible display unit 251, such that an angle between the auxiliary link 271 and the spring supporting portion 275 is smaller than 180° in the first state. As an elastic force of the spring 274 is applied to the auxiliary link 271, generated is a force to push the plurality of blocks 261 at one side of the blocks, in a direction crossing the links 265b of the second group. Under such configuration, the plurality of blocks 261 may be adhered to each other in the first state. If the first state is converted into the second state, an angle between the auxiliary link 271 and links arranged at an outermost side among the links 265b of the second group is increased. Accordingly, the auxiliary link 271 is converted into a state where an angle between the auxiliary link 271 and the spring supporting portion 275 is smaller than 180°, at a side close to the flexible display unit 251. Accordingly, an elastic force of the spring 274 is used to push the plurality of blocks 261 in the second state, in a direction parallel to the links 265b of the second group. Since such force is applied along a curved path of the folding region 230, a force to maintain the second state may be generated. In this embodiment, a direction of an elastic force of the spring is changed, if folding occurs in the folding region with exceeding a half of a rotation radius. However, the present invention is not limited to this.

In this embodiment, the connection unit 262 is provided at one end of the plurality of blocks 261. However, the connection unit 262 may be provided at two ends of the plurality of blocks 261, respectively. In this instance, a structure of the connection unit 262 may be equally applied to another end of the plurality of blocks 261, and detailed explanations thereof will be replaced by the aforementioned explanations.

The present invention provides a novel structure of a case for accommodating the plurality of blocks 261. Hereinafter, the new structure of the case will be explained.

Referring to FIGS. 5B and 7C, a plurality of plates 281 for covering the blocks 261 may be mounted to the blocks 261. The body of the portable electronic device is provided with a front surface where the flexible display unit 251 is arranged, and a rear surface where the plurality of plates 281 are arranged. The plurality of plates 281 may be exposed to the outside from the rear surface.

In this instance, the plurality of plates 281 may be formed such that at least part thereof is overlapped with neighboring plates. Under such configuration, the blocks 261 and spaces between the blocks 261 can not be viewed from the outside.

More specifically, each of the plurality of plates 281 is provided with a base portion 281a, part coupled to the block 261. An extension portion 281b is formed to extend from the base portion 281a, toward a neighboring block. The extension portion 281b is formed to cover a base portion of a neighboring plate. The plurality of plates 281 may be formed to have a curved surface, not a planar surface. Under such configuration, the degree that the extension portion 281b of one plate covers the base portion of another neighboring plate can be changed more easily, along a curved path of the folding unit 260.

Referring to FIGS. 6 and 7E, a cover 282 formed of a flexible material may be mounted to a side surface of the body of the portable electronic device. In this embodiment, at least part of the cover 282 is formed to be flexible so as to be transformed by an external force.

For instance, the cover 282 may be formed to be foldable at a plurality of points, along the side surface of the body. That is, the cover 282 is formed to have a consecutive rounded structure, so as to be transformed along a curved path of the folding unit 260. The cover 282 is formed to have a length corresponding to the folding unit 260, and is formed to cover a side surface of the folding unit 260. More specifically, the cover 282 may be provided with two fixing cover portions 282a for covering the fixing portions, and a folded cover portion 282b folded at a plurality of points between the fixing cover portions 282a. Under such structure, an interval between parts of the folded cover portion 282b is constant in the first state, whereas the interval is widened in the second state. This can implement a structure where the portable electronic device can be freely transformed with blocking a side surface of the folding unit 260.

In the present invention, the flexible display unit 251 is provided with a multi-layer structure so that it can be folded more easily together with the folding unit 260. Hereinafter, such multi-layer structure will be explained in more detail with reference to FIGS. 6 and 8B.

As shown, the flexible display unit 251 includes a flexible display 251a, a first member 251b and a second member 251c. In this instance, the first member 251b is arranged to be overlapped with the flexible display 251a, and the second member 251c is arranged to be overlapped with the first member 251b.

The flexible display 251a is provided with a folding region 230a overlapped with the folding unit 260, and a first region 210a and a second region 220a formed at two sides of the folding region 230a and coupled to the first member 251b. The folding region, the first region and the second region may correspond to the aforementioned folding region 230, first region 210 and second region 220 of the flexible display unit 251.

The first region 210a and the second region 220a formed at two sides of the flexible display 251a based on the folding region 230a may be bonded to the first member 251b, respectively. Under such structure, only the folding region 230a may be transformed separately from the first member 251b. Since two sides of the flexible display 251a are fixed, transformation occurs intensively on the folding region when the portable electronic device is folded. A space where the intensive transformation occurs, may be obtained by a gap between the folding region 230a and the first member 251b, because the folding region 230a is not coupled to the first member 251b.

As aforementioned, the flexible display 251a may be implemented as a flexible display device such as an OLED display and a micro LED display. At least one of the first member 251b and the second member 251c may be formed of a shape memory alloy configured to return to the original shape by remembering a shape at a specific temperature.

For instance, the first member 251b, configured to press at least part of the flexible display 251a, is arranged on a rear surface of the flexible display 251a. The first member 251b is arranged so as to be covered by the flexible display 251a, and is configured to be transformed by a temperature change. That is, the first member 251b is arranged to apply a force to the aforementioned folding region 230 of the flexible display unit 251, by its transformation.

For instance, the first member 251b is configured to be transformed to a curved shape from a flat shape, when a first temperature is changed into a second temperature by current supply. The first member 251b is configured to be transformed to the flat shape from the curved shape, when the second temperature is changed into the first temperature by radiation. That is, the first member 251b is configured to have a flat shape at a first temperature, and to have a curved shape at a second temperature. However, the present invention is not limited to this. That is, the first member 251b is configured to have a curved shape at a first temperature, and to have a flat shape at a second temperature.

In this instance, the first member 251b is arranged below the flexible display unit 251, and is configured to apply a force to the folding region 230 of the flexible display 251a when transformed to a convex shape.

As aforementioned with reference to FIGS. 4A to 4C, the portable electronic device may be in the aforementioned second state, in a sleep mode or a doze mode. And the portable electronic device may be in the aforementioned first state, in an active mode implemented due to occurrence of an event, etc.

The controller 180 is electrically connected to the first member 251b so as to control the first member 251b. More specifically, the controller 180 is configured to control current supply to the first member 251b, and a temperature of the first member 251b is changed according to the current supply. A printed circuit board 281 may be configured as an example of the controller 180 for operating various functions of the portable electronic device. A temperature sensor (not shown) configured to detect a temperature of the first member 251b may be mounted to the PCB 281.

The controller 180 may control current supply so that a first temperature can be a room temperature, and a second temperature can be higher than the first temperature. In this instance, the first member 251b may have a flat shape at the first temperature, and may have a convex curved shape at the second temperature.

For instance, if a user's input is received in the first state, the controller 180 increases a temperature of the first member 251b into the second temperature by supplying a current to the first member 251b. The portable electronic device can be converted into the second state by being folded by the user's input without an additional external force, because the first member 251b has a curved shape at the second temperature.

As another example, the first member 251b can have a flat shape at a first temperature, and can have a concaved curved shape at a second temperature. In this instance, the controller controls transformation of the first member 251b using the first and second temperatures. For instance, if the first member is folded according to a folded state of the folding unit, the first member 251b is transformed. Two ends of the first member 251b may be fixed to the body. Thus, the first member 251b is intensively transformed at a folded part when folded. The controller increases a temperature of the first member into the second temperature, thereby implementing transformation due to temperature in an opposite direction to a direction of the transformation. Under such configuration, intensive transformation occurring on a folding region of the first member 251b can be attenuated when the first state is converted into the second state.

Both the first member 251b and the second member 251c may be formed of a shape memory alloy.

For instance, the first member 251b and the second member 251c may be formed of the same type of shape memory alloy. In this instance, the controller 180 may control a transformation rate of the first and second members 251b and 251c, by controlling the amount of current supplied to the first and second members 251b and 251c. Under such configuration, the first and second members 251b and 251c may be controlled at the same temperature in the same manner, or may be controlled at different temperatures in a different manner. If a plate is bent, a transformation rate due to the bending becomes different in a thickness direction. In this embodiment, a transformation rate due to bending can be properly compensated by a designer, because the transformation rate is controlled in an overlapped state between the first and second members 251b and 251c. However, the present invention is not limited to this. For instance, the controller 180 may supply the same amount of current to the first and second members 251b and 251c, despite a difference of transformation rates.

As another example, the first and second members 251b and 251c may be formed of the same type of shape memory alloy with different thicknesses. Alternatively, the first and second members 251b and 251c may be formed of different types of shape memory alloys. In this instance, even if the controller 180 supplies the same amount of current to the first and second members 251b and 251c in order to control transformation rates of the first and second members 251b and 251c, the first and second members 251b and 251c may have different transformation rates.

An insulator (not shown) may be disposed between the first and second members 251b and 251c. The insulator is formed of a flexible and transformable material such as rubber.

So far, it has been explained that at least one of the first and second members 251b and 251c is formed of a shape memory alloy. However, the present invention is not limited to this. The first and second members 251b and 251c may be configured as metallic plates, rather than plates formed of a shape memory alloy.

In this instance, the first and second members 251b and 251c may be formed of aluminum or stainless steel. A plurality of slits may be formed at a body of the first and second members 251b and 251c. The plurality of slits may be through holes which penetrate the body. More specifically, through patterns are formed at a metallic plate. The through patterns may be formed by a laser processing when the body is formed of aluminum, whereas it may be formed by a press processing when the body is formed of stainless steel.

In this instance, one of the first and second members 251b and 251c may be formed of a material having lower intensity than that of the other. For instance, the second member 251c is formed of a material having lower intensity than that of the first member 251b. This can allow the flexible display unit to be movable more flexibly when bent.

As another example, one of the first and second members 251b and 251c may be provided with slits of a preset pattern, and another thereof may be provided with slits of a pattern different from the preset pattern. In this instance, the first and second members 251b and 251c may be formed of the same material.

The first member 251b is not coupled to the second member 251c at part corresponding to the folding region 230 of the flexible display unit 251. For instance, the second member 251c may be coupled to the first member 251b at two sides of the folding region 230. Under such structure, there exists a gap between the flexible display unit 251 and the blocks. This may result in a transformation space of the folding region 230 of the flexible display unit 251 when the portable electronic device is folded.

As aforementioned, as the flexible display unit 251 has a multi-layer structure, a folding operation can be implemented more flexibly.

The controller 180 may determine a state of the portable electronic device among the aforementioned states, using at least one sensing unit 140 (refer to FIG. 1). The sensing unit 140 may include a proximity sensor, an IR sensor, a magnetic sensor and an illumination sensor, and may sense a relative position of the folding region with respect to the first region or the second region.

As another example, the sensing unit 140 may include a bend sensor (not shown) disposed on one of a front surface and a rear surface of the flexible display unit 251 or on both of them, the bend sensor configured to sense a bent state of the flexible display unit 251. The bend sensor means a sensor formed to be bendable and configured to sense a bent state using a characteristic that a resistance value is variable according to a bent degree. For instance, the bend sensor may be implemented as an optical fiber bending sensor using a transformation rate of optical fiber, an electric resistance type bending sensor using an electric resistance, a pressure sensor, a strain gauge, etc. The sensing unit 140 may calculate a resistance value of the bend sensor based on a size of a voltage applied to the bend sensor, or a size of a current flowing on the bend sensor. Then the sensing unit 140 may sense a bending-occurred position, a bending degree, etc. based on the calculated resistance value.

The controller 180 determines a state of the portable electronic device using the sensing unit 140, and controls information output to the flexible display unit 251 according to a result of the determination.

So far, a hardware configuration of the portable electronic device, where the portable electronic device is folded at a folding region and then is restored to a flat state, has been explained. The aforementioned hardware configuration may be modified in various manners, and such modification will be explained hereinafter.

Figure 10A:
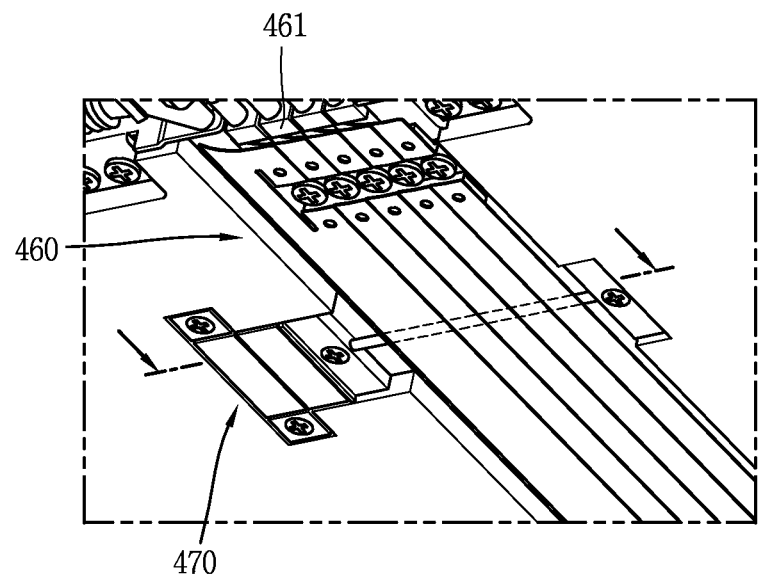
FIGS. 10A and 10B are a perspective view and a sectional view, respectively, which illustrate modification examples of a pressing module of FIG. 6.
Figure 10B:
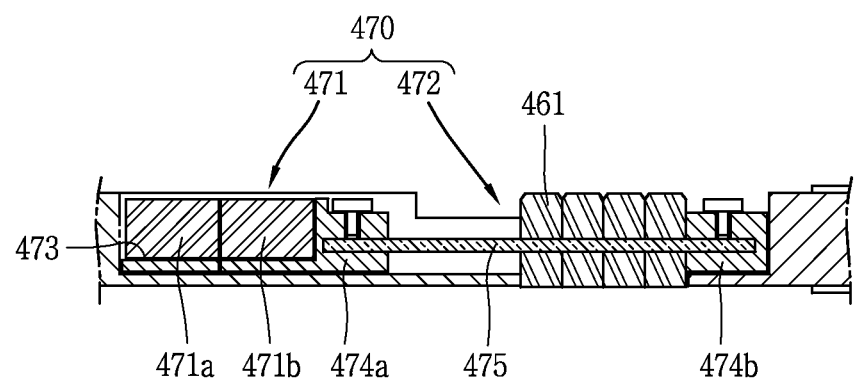
Figure 11A:
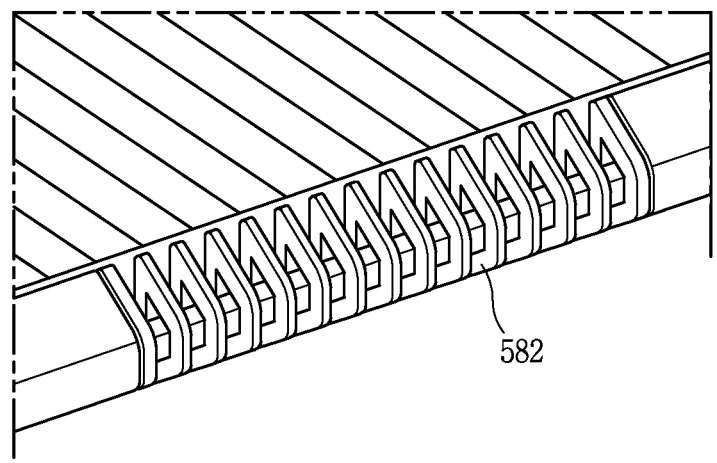
FIGS. 11A and 11B are perspective views illustrating a modification example of a cover of FIG. 7E.
Figure 11B:
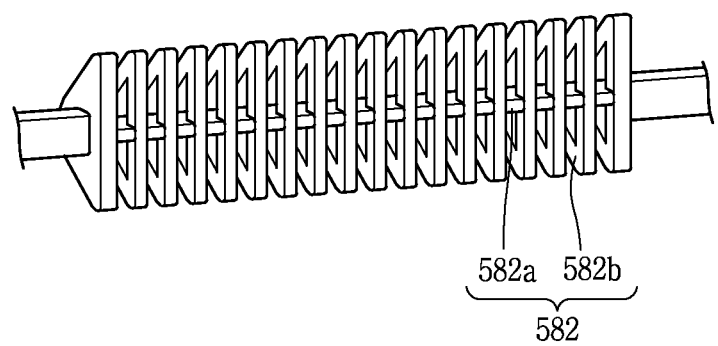

FIGS. 9A to 9D are sectional views illustrating modification examples of a plurality of blocks of FIG. 6. FIGS. 10A and 10B are a perspective view and a sectional view, respectively, which illustrate modification examples of a pressing module of FIG. 6. FIGS. 11A and 11B are perspective views illustrating a modification example of a cover of FIG. 7E.

Figure 9A:
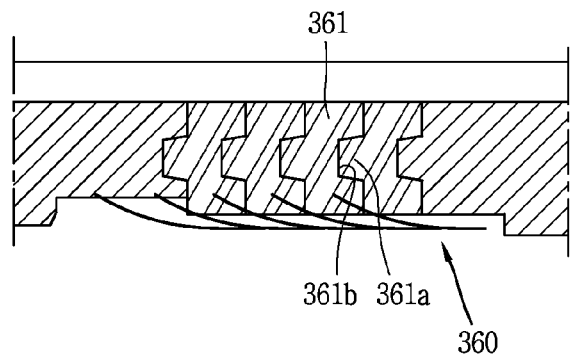
FIGS. 9A to 9D are sectional views illustrating modification examples of a plurality of blocks of FIG. 6.
Figure 9B:
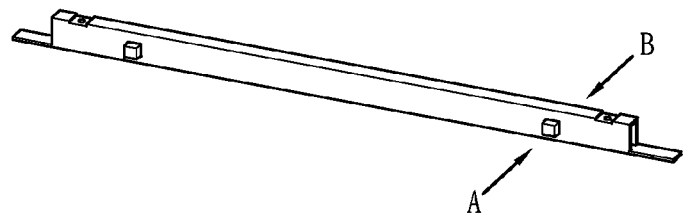
Figure 9C:
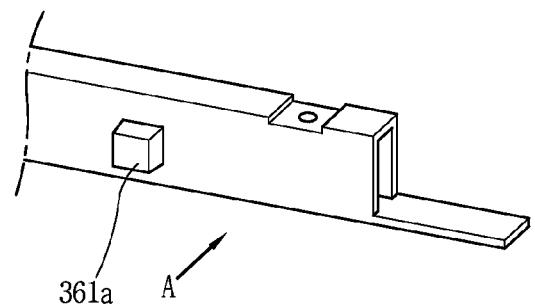
Figure 9D:
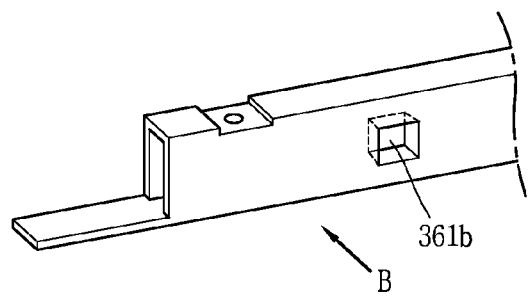

Referring to FIGS. 9A to 9D, a plurality of blocks may be configured to have an enhanced flatness in a grouped manner. FIG. 9C is a partial view seen from a direction 'A' of FIG. 9B, and FIG. 9D is a partial view seen from a direction 'B' of FIG. 9B.

Referring to the drawings, the flexible display unit 251 (refer to FIG. 6) is provided with a front surface and a rear surface, and a folding unit 360 is formed at the rear surface of the flexible display unit 251. The folding unit 360 may be configured to be foldable together with the flexible display unit 251, and may be arranged at a position corresponding to the aforementioned folding region 230 (refer to FIG. 3A). More specifically, the folding unit 360 includes a plurality of blocks 361. For instance, the plurality of blocks 361 are overlapped with each other on a rear surface of the flexible display unit 251. And at least part of the plurality of blocks 361 is arranged to be relatively-movable with respect to neighboring blocks in a direction to become far from or close to the neighboring blocks. Explanations about a structure or a function of other components rather than the plurality of blocks 361 will be replaced by the explanations about the flexible display unit, the folding unit, the controller, the cover, etc. aforementioned with reference to FIGS. 5A-5B, 6, 7A-7E, and 8A-8B.

As shown, the plurality of blocks 361 are formed as bars long-formed in one direction. For instance, the plurality of blocks 361 are formed to extend along one edge of the flexible display unit 251, and are arranged in parallel to each other in a first state where the flexible display unit 251 is flat.

The plurality of blocks 361 may have a rectangular cylinder shape so that both side surfaces and a bottom surface can have a quadrangular shape. The plurality of blocks 361 may be long formed in a first direction parallel to short edges of the flexible display unit 251, and may be sequentially arranged in a second direction perpendicular to long edges of the flexible display unit 251. The plurality of blocks 361 may have a separation distance therebetween in the second direction. For change of the separation distance, the plurality of blocks are formed such that at least part thereof is movable to a direction to become far from or close to neighboring blocks.

In this instance, a side surface of one block may be arranged to face a side surface of another neighboring block. A block protrusion 361a may be formed on a first side surface of the blocks 361, and a block groove 361b may be formed on a second side surface of the blocks 361. The first side surface and the second side surface may be toward opposite directions to each other, and the block protrusion 361a and the block groove 361b may be arranged at positions corresponding to each other. More specifically, a first block 361c and a second block 361d are disposed close to each other, and the block protrusion 361a of the first block 361c is disposed to face the block groove 361b of the second block 361d. Each of the block protrusion 361a and the block groove 361b may be provided in plurality, and the block protrusions 361a and the block grooves 361b may be spaced from each other in a lengthwise direction of the blocks.

In a first state where the flexible display unit 251 is flat, the block protrusion 361a of the first block 361c is accommodated in the block groove 361b of the second block 361d. If the first state is converted into a second state where the folding unit is folded, at least part of the plurality of blocks 361 is relatively-moved with respect to neighboring blocks in a direction to become far from the neighboring blocks. Here, the block protrusion 361a is moved to a direction to be separated from the block groove 361b. In this instance, at least part of the block protrusion 361a may be accommodated in the block groove 361b in the second state. However, the present invention is not limited to this. That is, in the second state, the block protrusion 361a can be completely separated from the block groove 361b.

In this embodiment, even if an external force is applied in a thickness direction of the portable electronic device in the first state, the plurality of blocks 361 are not transformed in the thickness direction. This can enhance flatness in unit of the blocks.

Referring to FIGS. 10A and 10B, a pressing module may be implemented by magnets and a wire, not a spring.

Referring to the drawings, the flexible display unit 251 (refer to FIG. 6) is provided with a front surface and a rear surface, and a folding unit 460 is formed at the rear surface of the flexible display unit 251. The folding unit 460 may be configured to be foldable together with the flexible display unit 251, and may be arranged at a position corresponding to the aforementioned folding region 230 (refer to FIG. 3A). More specifically, the folding unit 460 includes a plurality of blocks 461. Explanations about a structure or a function of other components rather than the plurality of blocks 461 will be replaced by the explanations about the flexible display unit, the folding unit, the controller, the cover, etc. aforementioned with reference to FIGS. 5A~5B, 6, 7A~7E, and 8A~8B.

In this embodiment, the portable electronic device may include a pressing module 470 configured to apply a force to the plurality of blocks 461, toward a direction which makes the blocks 261 move close to each other, in the first state where the flexible display unit 251 is flat. In this instance, the pressing module 470 is formed to apply a force to a region adjacent to one end of the plurality of blocks 461, in a direction passing through the flexible display unit 251.

As shown, the pressing module 470 may be formed to apply a force to the plurality of blocks by converting a magnetic force into a tension. For instance, the pressing module 470 includes a magnetic force application portion 471 and a tension application portion 472.

The magnetic force application portion 471 is provided with a plurality of magnets 471a and 471b. The first magnet 471a is mounted to a mounting portion 473 of the portable electronic device, and the second magnet 471b is arranged at the mounting portion 473 so as to be slidably-movable.

The tension application portion 472 is provided with supporting members 474a and 474b, and a wire 475. The second magnet 471b is mounted to the first supporting member 474a, and the second magnet 471b is moved as the first supporting member 474a is slidably-moved. As shown, the wire 475 may be mounted to the first supporting member 474a, and the wire 475 may be fixed to the second supporting member 474b by passing through the plurality of blocks 461.

As shown, in a first state where the flexible display unit 251 is flat, the second magnet 471b is attached to the first magnet 471a. In this instance, the wire 475 has a tension due to its tense state. Since the tension serves to pull the second supporting member 474b, the plurality of blocks 461 are disposed close to each other in the first state.

In this instance, if the portable electronic device is converted into the second state from the first state, the plurality of blocks 461 are widened from each other, and thus the first and second magnets 471a and 471b are spaced from each other. In this embodiment, a greater force may be generated than in a case where the pressing module is provided with a spring.

Referring to FIGS. 11A and 11B, the cover of FIG. 7E may be implemented in other form.

Explanations about a structure or a function of other components rather than the cover 582 will be replaced by the explanations about the flexible display unit, the folding unit, the controller, etc. aforementioned with reference to FIGS. 5A~5B, 6, 7A~7E, and 8A~8B.

The cover 582 is formed to be flexible so that at least part thereof can be transformed by an external force. For instance, the cover 582 includes a central part 582a, and a plurality of flat parts 582b.

The central part 582a is formed to have a length corresponding to the folding unit 260, and is formed to cover a side surface of the folding unit 260 (refer to FIG. 6). The central part 582a may be formed of a flexible material such as rubber, so as to be transformable as the folding unit is folded.

The plurality of flat parts 582b are formed at the central part 582a, and are sequentially arranged in a lengthwise direction of the central part 582a. The plurality of flat parts 582b are formed as thin plates so that spaces can be formed therebetween.

Since the central part 582a is formed of a flexible material and spaces are formed between the plurality of flat parts 582b, the cover 582 can be easily transformed according to a folded state of the folding unit. This can implement a structure where the portable electronic device can be freely transformed with blocking a side surface of the folding unit 260. However, the present invention is not limited to this. A silicon material, etc. can be filled in the spaces.

Further, the present invention provides a new control operation of a portable electronic device, with respect to a mechanism that the flexible display unit is folded like a book. Hereinafter, such control operation will be explained in more detail with reference to FIGS. 12 and 16.

FIGS. 12A to 16 are conceptual views illustrating operations to control a portable electronic device according to embodiments of the present invention.

Figure 12A:
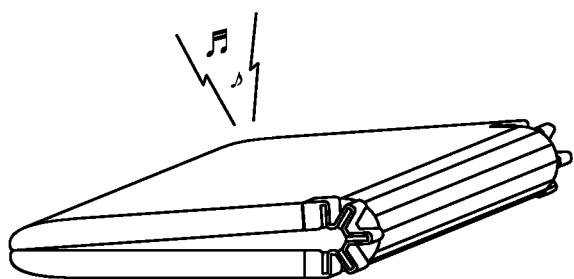
FIGS. 12A to 16C are conceptual views illustrating operations to control a portable electronic device according to embodiments of the present invention.
Figure 12B:
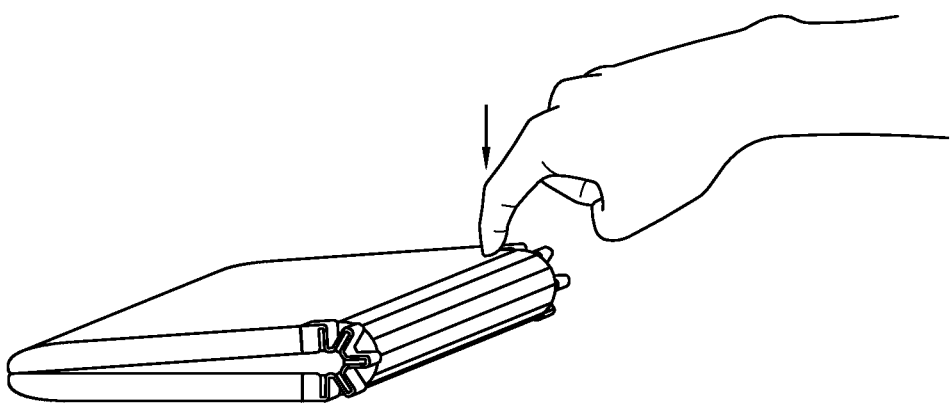

Referring to FIGS. 12A and 12B, the first region 210 and the second region 220 of the flexible display unit 251 (refer to FIG. 6) may be spaced from each other in the second state, since the folding unit is folded along a curved path. Further, under the structure of the aforementioned folding unit (folding unit and pressing module), the folding unit 260 is operated like a spring when pushed. For instance, if the folding unit is pushed, the portable electronic device is transformed to the pushing direction. Then the portable electronic device returns to the original position when the pushing operation is completed. Using such principle, the folding unit may serve as a switch.

Referring to FIG. 12A, the flexible display unit 251 may be deactivated in the second state, and the portable electronic device may be in a lock mode where reception of a control command by a user is restricted.

If an event has occurred from one or more applications (or programs) in the second state, the controller 180 (refer to FIG. 1) informs a user of the event, by outputting a sound, a vibration, a light, an image, etc.

Occurrence of an event may correspond to a missed call, an application to be updated, an arrived message, charging, a power 'ON' or 'OFF' state of the portable electronic device, an LCD awake key, an alarm, an incoming call, a missed notification, etc.

As an example of the event, if a call signal for call connection is received, a vibration may occur on the portable electronic device. Referring to FIG. 4B, if the folding unit 260 is pushed while a vibration occurs due to reception of a call signal, a preset function related to an application may be performed. For instance, a call connection may be performed by receiving a call in the second state. As another example, an operation to reject reception of a call may be performed.

For such operation, the controller 180 senses a push input applied to the folding unit 260 of the flexible display unit 251, using the sensing unit 140 (refer to FIG. 1). More specifically, if the folding unit 260 is pressed as an external force is applied to the folding unit 260, the sensing unit 140 senses such transformation of the folding unit 260.

As another example, if the event corresponds to a received text message, the controller 180 informs a user of the received text message by outputting a sound, a vibration, a light, an image, etc. For instance, a light of a specific color may be output to a rear input unit. If the folding unit 260 is pushed, the sensing unit senses the pushed state, and a text message may be output in response to the sensing. The output may be performed in the form of a voice or a text. In this instance, an additional screen may be provided on a rear cover, and a text message may be displayed on the additional screen. Then the text message may disappear after lapse of a predetermined time.

When the portable electronic device is converted to the first state from the second state (or vice versa), a camera-related function can be executed.

Figure 13:
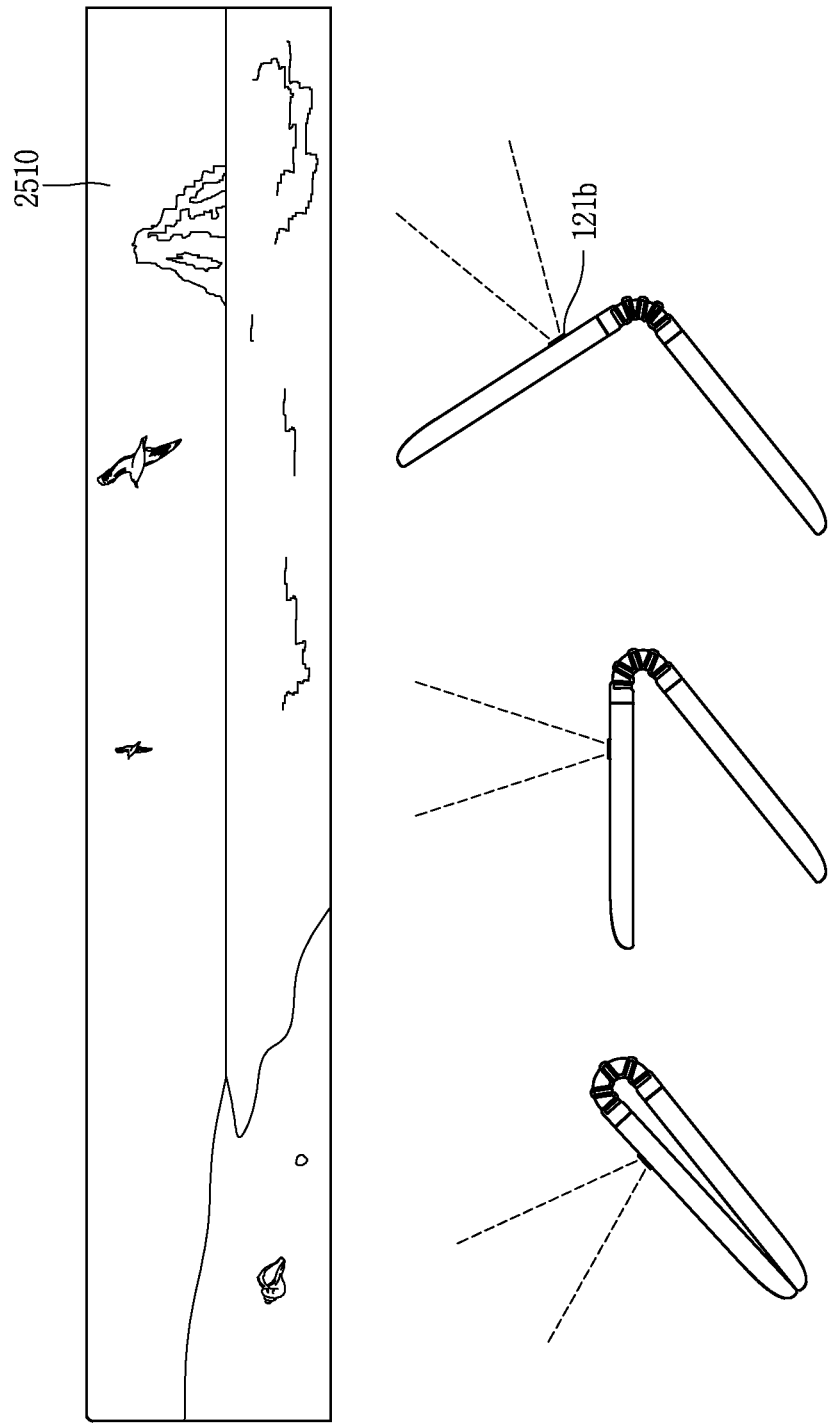

As shown in FIG. 13(*a*), when the portable electronic device is converted to the first state from the second state, the controller 180 activates part of the flexible display unit 251, and displays a preview screen received through a camera. In this instance, the rear camera 121*b* is toward a rear direction, and the controller 180 automatically executes a panorama capturing mode.

In this instance, the controller 180 may display the preview screen on an entire region of the flexible display unit 251, and may execute the panorama capturing mode. That is, a camera-related setting value is changed into values corresponding to the panorama capturing mode. Further, a graphic object to execute a function related to the panorama capturing mode may be displayed on the preview screen.

Under such configuration, a user can execute a panorama capturing mode by folding or unfolding part of the body where the camera has been arranged. This can allow a user-friendly interface to be provided.

As shown in FIG. 13(*b*), when the portable electronic device is converted to the first state from the second state, the controller 180 may activate part of the flexible display unit 251, and may output a panoramic image 2510 together with the received preview screen. For instance, the preview screen may be output to a first region, and the panoramic image 2510 may be output to a second region. In this instance, the panoramic image 2510 may be formed so that a frame can be gradually increased according to an unfolded degree of the portable electronic device. For such control operation, conversion of the second state to the first state in the panorama capturing mode may be sensed by the sensing unit 140.

Further, when the portable electronic device of the present invention is converted to the second state from the first state (or vice versa), a function related to output of an execution screen of an application can be performed.

The application includes a widget, a home launcher, etc., and means all types of programs which can be driven in the portable electronic device. Thus, the application may be a program for performing web browsing, play of moving images, transception (transmission/reception) of messages, schedule management, and update of an application.

Figure 14A:
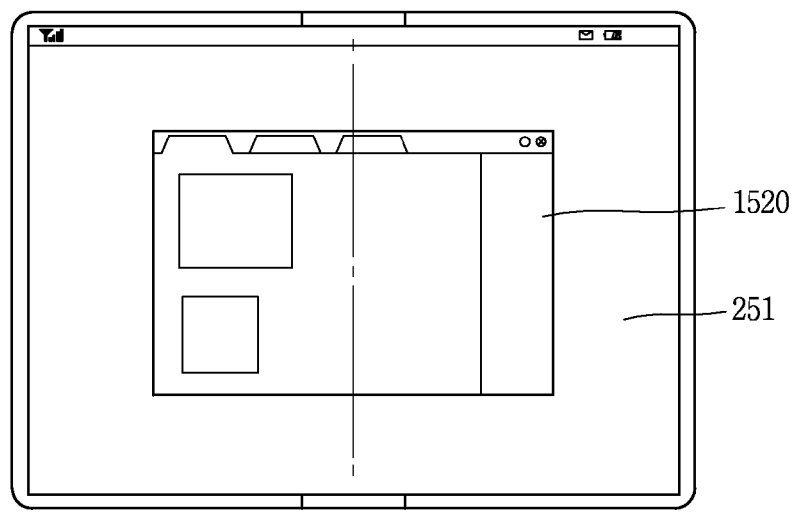
Figure 14B:
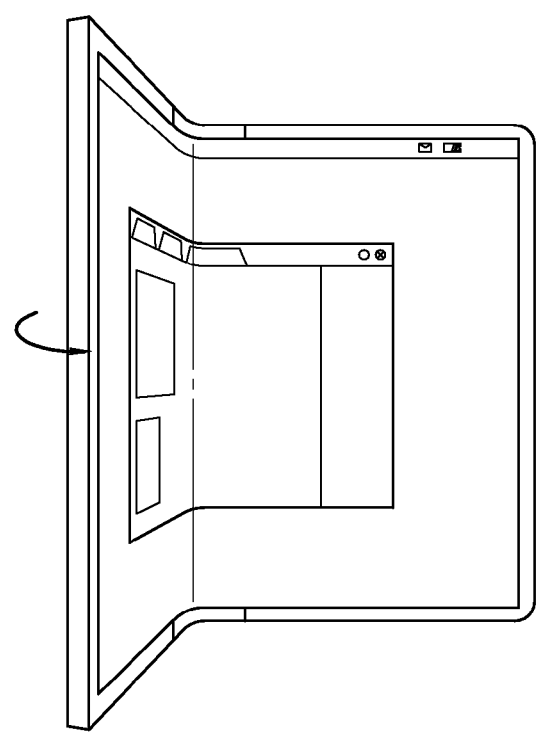
Figure 14C:
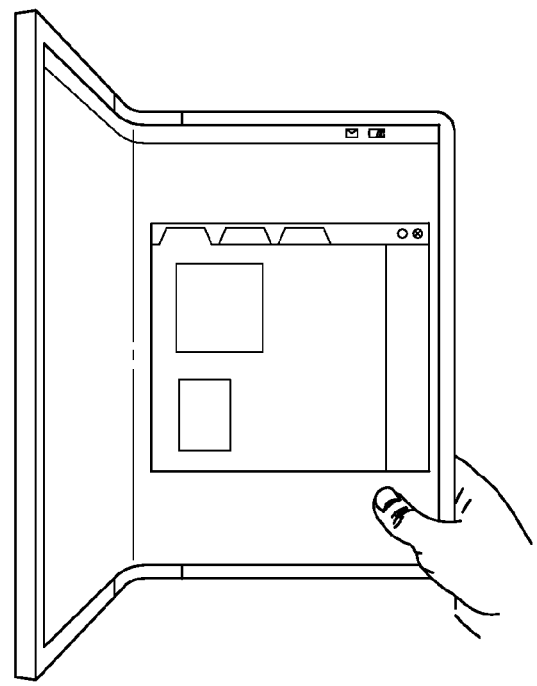

Referring to FIGS. 14(*a*) and (*b*), if the portable electronic device is converted to the second state from the first state, in an output state of an execution screen, the execution screen is moved. For instance, if folding is started when a web browser 1520 has been output to the flexible display unit 251, the sensing unit 140 senses the folding. Then, the sensing unit 140 senses a folding basis part (e.g., second region), or part to be folded (e.g., first region). The folding basis part may be a motionless part when folding occurs, and the part to be folded may be a motion-occurred part.

Under an assumption that a folded state between the first state and the second state is a third state, the sensing unit 140 senses the third state. In the third state, the controller 180 moves the web browser 1520 so that an entire region of the web browser 1520 can be output to the folding basis part. In this instance, the sensing unit 140 may sense part held by a user's hand (part blocked by a user's hand) among the folding basis part, and then may output the web browser 1520 to other part rather than the sensed part (refer to FIG. 14(*c*)).

Figure 15A:
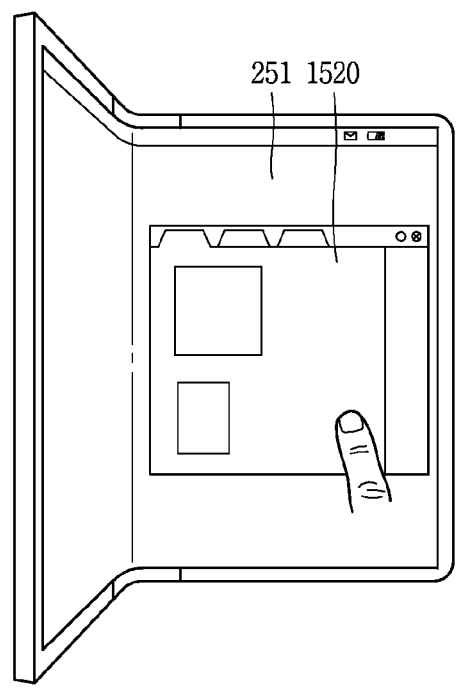
Figure 15B:
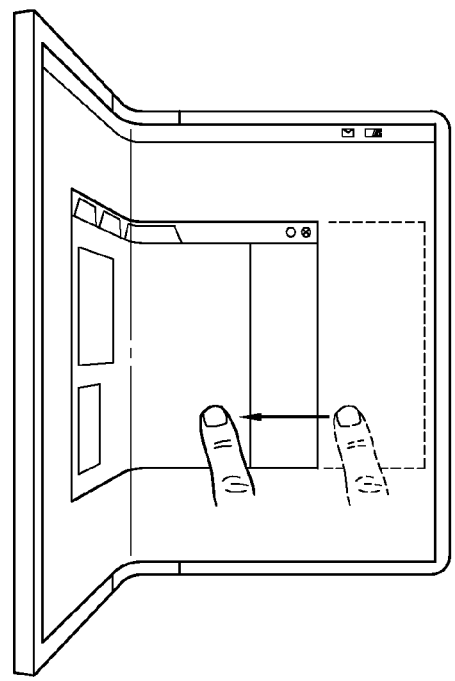

Referring to FIG. 15, the web browser 1520 moves along a user's drag input in the third state. In this instance, dragging to the part to be folded may be restricted. Accordingly, the web browser 1520 is partially moved to the part to be folded by a user's drag input as shown in FIG. 15(*b*). Then, if the user's drag input is released, the web browser 1520 may be output to the original position. The original position may be a position where an entire region of the web browser 1520 is output to the folding basis part.

Figure 16A:
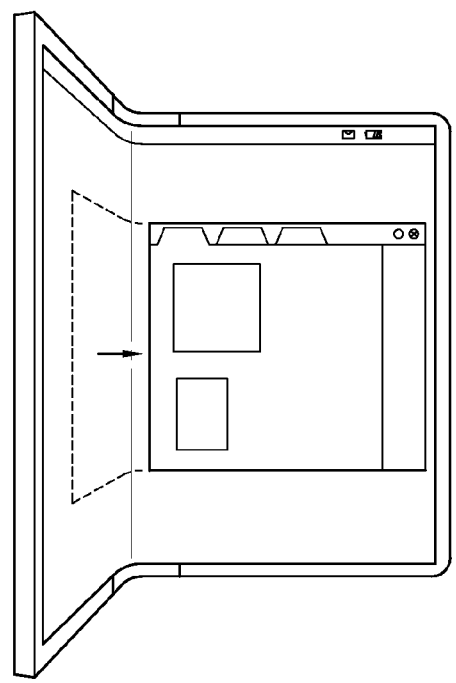
Figure 16B:
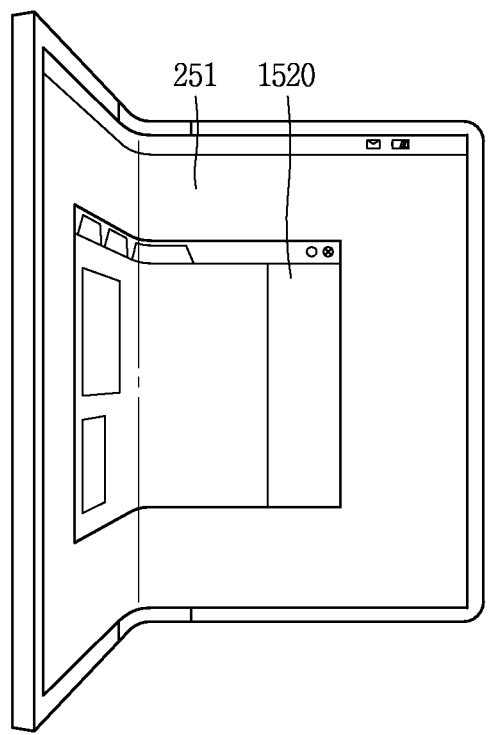
Figure 16C:
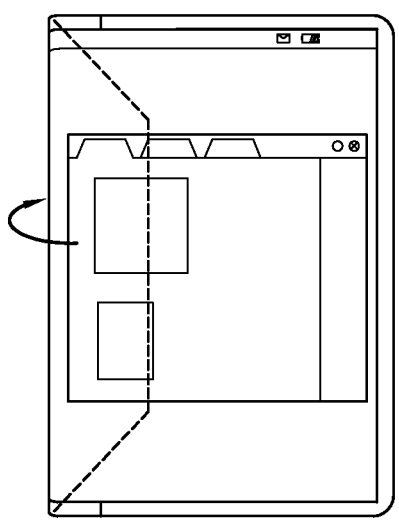

Referring to FIG. 16, if the portable electronic device is backward folded in the first state when an execution screen has been output, the execution screen is moved. The backward folding means folding of the portable electronic device when the flexible display unit has been exposed to the outside.

If backward folding of the portable electronic device is started when the web browser 1520 has been output to the flexible display unit 251, the sensing unit 140 senses the backward folding. Under an assumption that the backward folding is a fourth state, the sensing unit 140 senses the fourth state. In the fourth state, the controller 180 moves the web browser 1520 so that the web browser 1520 can be output to one of two screens which are toward opposite directions. In this instance, the sensing unit 140 may sense part held by a user's hand (part blocked by a user's hand) among the folding basis part, and then may output the web browser 1520 to other part rather than the sensed part (refer to FIG. 16(*b*)).

Owing to a new form factor to fold and unfold the portable electronic device like a book, a new user interface interworked with folding and unfolding operations can be implemented.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the portable electronic device.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable electronic device comprising:
    a flexible display unit having a front surface and a rear surface; and
    a folding unit in contact with the rear surface of the flexible display unit, the folding unit including a plurality of blocks and a connection unit, the connection unit connecting the plurality of blocks to each other,
    wherein the plurality of blocks and the connection unit are arranged such that at least one or more of the plurality of blocks move along a curved path when the flexible display unit transitions to and from a first state and a second state, wherein the flexible display unit is flat in the first state and folded in the second state,
    wherein the connection unit comprises a plurality of links coupled to the plurality of blocks,
    wherein the plurality of links comprise a first group of links and a second group of links,
    wherein each of the links of the first group crisscrosses a corresponding one of the links of the second group,
    wherein each of the links of the second group of links comprises a protrusion rotatably connected to the corresponding link of the first group of links where they crisscross, and
    wherein each of the links of the second group of links includes a groove that accommodates therein an end portion of a neighboring link of the second group when the flexible display unit is in the second state.

2. The portable electronic device of claim 1, wherein the plurality of blocks are elongated in a direction corresponding to one of a width or length dimension of the portable electronic device, and wherein the plurality of blocks are disposed in a planar configuration and parallel to each other when the flexible display unit is in said first state.

3. The portable electronic device of claim 2, wherein one or more of the plurality of blocks are disposed along a curved path when the flexible display unit is in the second state.

4. The portable electronic device of claim 3, wherein an angular relationship exists between facing sides of neighboring blocks disposed along a curved path when the flexible display unit is in the second state.

5. The portable electronic device of claim 3, further comprising a pressing module configured to apply a force to the plurality of blocks, and to move the blocks into the planar configuration, and maintain the plurality of blocks in the planar configuration when the flexible display unit is in the first state.

6. The portable electronic device of claim 1, further comprising:
    a body;
    a first fixing portion; and
    a second fixing portion, wherein the first fixing portion and the second fixing portion are fixed to the body and arranged such that the plurality of blocks are interposed there between.

7. The portable electronic device of claim 1 further comprising:
    a plurality of plates mounted to the blocks and covering, at least in part, a rear side of the blocks, wherein the flexible display unit is positioned over a front side of the blocks.

8. The portable electronic device of claim 7, wherein each of the plurality of plates overlaps a neighboring plate.

9. The portable electronic device of claim 7 further comprising:
    a body, wherein the flexible display unit is visible through a front surface of the body, and wherein the plurality of plates are visible through a rear surface of the body.

10. The portable electronic device of claim 1, wherein the connection unit comprises a plurality of links attached to the ends of the plurality of blocks and wherein each of the plurality of links connects the ends of two neighboring blocks such that the blocks are movable relative to each other.

11. The portable electronic device of claim 10, wherein the plurality of links comprise a first group of links sequentially connected to each other, and a second group of links sequentially connected to each other, wherein each of the links of the first and second groups of links connects a front, side portion of one block to a rear, side portion of a neighboring block, and wherein each of the links of the first group crisscross a corresponding one of the links of the second group.

12. The portable electronic device of claim 11, wherein each of the links of the first group is rotatably connected to the corresponding one of the links of the second group where the two links crisscross.

13. The portable electronic device of claim 12, wherein each of the links of the second group of links comprises a protrusion rotatably connected to the corresponding link of the first group of links where they crisscross.

14. The portable electronic device of claim 13, wherein each of the links of the second group include grooves that accommodate therein an end portion of a neighboring link of the second group when the flexible display unit is in the second state.

15. The portable electronic device of claim 11, wherein the links are configured as three-point links such that links of the first group are connected end to end in sequence, links of the second group are connected end to end in sequence, and each link is connected in the middle to the corresponding link of the other group of links.

16. The portable electronic device of claim 1 further comprising:
- a body;
- a cover formed of a flexible material mounted to a side surface of the body and covering, at least in part, the connection unit.

17. The portable electronic device of claim 16, wherein the cover is foldable.

18. The portable electronic device of claim 1, wherein the flexible display unit includes:
- a flexible display;
- a first member configured to overlap the flexible display; and
- a second member configured to overlap the first member.

19. The portable electronic device of claim 18, wherein at least one of the first member and the second member is formed of a shape memory alloy configured to return to an original shape by remembering a shape at a specific temperature.

20. The portable electronic device of claim 19, wherein one of the first and second members is formed of a material having lower intensity than that of the other member.

21. The portable electronic device of claim 19, wherein the flexible display includes a folding region, overlapping the folding unit, and a first region and a second region formed at opposite sides of the folding region and coupled to the first member.

22. The portable electronic device of claim 1 further comprising:
- a body having a front surface and a rear surface, wherein the flexible display unit is disposed on the front surface of the body, and wherein the rear surface of the body constitutes a rear cover of the portable electronic device, and wherein the rear surface is flexible.

23. A portable electronic device comprising:
- a body at least part of which is flexible;
- a flexible display unit disposed on the body, the flexible display unit being transformable between a first state and a second state, wherein the flexible display unit is flat in the first state and folded in the second state; and
- a folding unit mounted to the body and supporting the flexible display unit, wherein the folding unit includes:
- a plurality of blocks, wherein one or more of the plurality of blocks move along a curved path when the flexible display unit transitions to and from the first state and the second state; and
- a connection unit configured to sequentially connect the plurality of blocks to each other,
- wherein the connection unit comprises a plurality of links coupled to the plurality of blocks,
- wherein the plurality of links comprise a first group of links and a second group of links,
- wherein each of the links of the first group crisscrosses a corresponding one of the links of the second group,
- wherein each of the links of the second group of links comprises a protrusion rotatable connected to the corresponding link of the first group of links where they crisscross, and
- wherein each of the links of the second group of links includes a groove that accommodates therein an end portion of a neighboring link of the second group when the flexible display unit is in the second state.

24. The portable electronic device of claim 23, wherein each of the plurality of blocks are elongated in a direction corresponding to one of the width or length dimension of the portable electronic device, and wherein the plurality of blocks are disposed in a planar configuration and parallel to each other in the first state.

25. The portable electronic device of claim 24, wherein one or more of the plurality of blocks are disposed along a curved path when the flexible display unit is in the second state.

26. The portable electronic device of claim 25, wherein the connection unit comprises a connection shaft, and wherein the plurality of blocks are formed such that one end thereof tilts based on the connection shaft of the connection unit, when the flexible display unit transitions from the first state to the second state.

\* \* \* \* \*